US006965967B2

(12) United States Patent
Takaichi

(10) Patent No.: US 6,965,967 B2
(45) Date of Patent: Nov. 15, 2005

(54) DISK MEMORY DEVICE, DATA PRE-READING METHOD, AND RECORDED MEDIUM

(75) Inventor: Noriaki Takaichi, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 429 days.

(21) Appl. No.: 09/980,311

(22) PCT Filed: Mar. 30, 2001

(86) PCT No.: PCT/JP01/02735

§ 371 (c)(1), (2), (4) Date: Feb. 7, 2002

(87) PCT Pub. No.: WO01/73538

PCT Pub. Date: Oct. 4, 2001

(65) Prior Publication Data

US 2003/0018849 A1 Jan. 23, 2003

(30) Foreign Application Priority Data

Mar. 31, 2000 (JP) .......................................... 2000-99040

(51) Int. Cl.[7] .............................................. G06F 12/00

(52) U.S. Cl. ........................ 711/113; 711/137; 711/154; 712/207

(58) Field of Search ................................ 711/113, 137, 711/154; 712/207

(56) References Cited

U.S. PATENT DOCUMENTS

| | | | | |
|---|---|---|---|---|
| 5,345,560 A | * | 9/1994 | Miura et al. | 711/3 |
| 5,581,728 A | | 12/1996 | Moritomo | |
| 5,687,347 A | * | 11/1997 | Omura et al. | 711/112 |
| 5,752,037 A | * | 5/1998 | Gornish et al. | 717/160 |

FOREIGN PATENT DOCUMENTS

| | | |
|---|---|---|
| JP | 6-67807 | 3/1994 |
| JP | 6-309798 | 11/1994 |
| JP | 7-6088 | 1/1995 |
| JP | 9-166997 | 6/1997 |
| JP | 10-171713 | 6/1998 |
| JP | 11-110139 | 4/1999 |
| JP | 11-212728 | 8/1999 |

* cited by examiner

*Primary Examiner*—Kimberly McLean-Mayo
(74) *Attorney, Agent, or Firm*—Wenderoth, Lind & Ponack, L.L.P.

(57) ABSTRACT

Based on an area which was accessed by a just-previous read command and an area which is required by a present read command, the direction of the access, the interval between the areas, and the area size are detected, and the position and size of an area on a disk memory medium where prereading of data is to be carried out are determined by using the detected values. Therefore, prereading of data can be efficiently carried out in response to continuous read commands which request data that are located in the backward direction, i.e., the direction in which an address decreases, or data that are located separately at equal intervals.

27 Claims, 20 Drawing Sheets

| | |
|---|---|
| present read area head sector No. | G |
| present read area size | H |
| last read area head sector No. | A |
| last read area size | B |
| last-but-one read area head sector No. | C |
| last-but-one read area size | D |
| present access direction value | I |
| last access direction value | E |

| | |
|---|---|
| access area head sector No. | Q |
| access area size | R |

Fig.14

| | |
|---|---|
| present read area head sector No. | G |
| present read area size | H |
| last read area head sector No. | A |
| last read area size | B |
| last-but-one read area head sector No. | C |
| last-but-one read area size | D |
| present access direction value | I |
| present area-to-area distance | J |
| last access direction value | E |
| last area-to-area distance | F |

DISK MEMORY DEVICE, DATA PRE-READING METHOD, AND RECORDED MEDIUM

BACKGROUND OF THE INVENTION

1. Field of the Invention

The present invention relates to a disk memory device for reading data that is recorded on a disk memory medium such as a magnetic disk, an optical disk, or the like and, more particularly, to a data prereading method for prereading data of the disk memory device.

2. Description of the Related Art

In order to increase the speed of reading continuously-arranged data on a disk memory device, there has been employed the following data prereading method. Reading of a data block which follows a data block for which a reading request has been made is started, and the read data are stored in a cache memory before a next reading request is received. When reading requests for continuous data blocks are received; the data which have been preread and stored in the cache memory are transferred, thereby performing a data transfer without being influenced by the disk rotation wait time or the reading head seek time.

As an example of such a prereading method, Japanese Published Patent Application No. Hei. 9-120617 discloses "METHOD FOR REDUCING POWER CONSUMPTION OF DISK DRIVE IN COMPUTER TO REALIZE HIGH SPEED DATA TRANSFER, AND DISK DRIVE CONNECTED WITH COMPUTER".

In the conventional prereading method, however, the direction along which the data blocks are successively arranged is assumed to be a single direction (the direction along which the logical block address increases) and, therefore, prereading of data cannot be carried out in response to an access for reading data continuously in the backward direction (the direction along which the logical block address decreases).

In recent years, a disk memory device has been increasingly used for recording/playback of video data, audio data, and the like, and the conventional method can provide effective prereading with respect to normal playback. However, when performing a trick play, e.g., a reverse playback, although the data which have already been read out and stored in the cache memory can be played backward, the data which are not stored in the cache memory must be read out successively. Further, during the reverse playback, there occurs a contradiction in that the data that are successive in the forward direction, which are not necessary, are preread, and as a result, an improvement of data transfer by prereading cannot be achieved.

Further, during the trick play such as fast-forward playback or fast-reverse playback, data that are sampled according to the playback speed are read out. In this case, when the conventional prereading method is employed, unnecessary data other than the required data are also stored in the cache memory and, therefore, the cache memory cannot be used effectively. Further, the interval of the required data areas is broadened as the playback speed is increased, which results in a data area that is to be requested is not present in the same track or the same cylinder. In this case, if reading of unnecessary data is performed, prereading of required data cannot be made in time, thereby resulting in an interruption of the playback of video or audio.

Further, in the conventional prereading method, when the preread data are set in the cache memory, the continuity of the preread data blocks that are stored in the cache memory is broken in a reverse playback since the data are stored in the direction along which the cache memory address increase in the order of the preread data. Therefore, in order to secure the continuity of the preread data blocks, it is necessary to form a cache entry, which is entry information into the cache memory, for each preread data block, and to enter the cache entry into the cache list, which results in a detriment to an efficient use of the cache memory.

Furthermore, in the playback that is based on the shuttle dial operation which enables a forward or reverse playback at a playback speed which is suited to a stop angle of a rotation dial that has been mounted on a remote controller of a video tape recorder in recent years, the playback speed can be changed in stages, and the present playback speed is returned frequently to the previous playback speed. In this case, the data that are required in the playback at the previous playback speed cannot be preread by the method of prereading only the data that are required at the present playback speed.

Further, this problem occurs not only in the playback that is based on the above-mentioned shuttle dial operation but also in the playback that is based on the jog dial operation which enables a forward or reverse playback while changing the playback speed from frame-by-frame playback to fast playback according to the speed and direction for rotating the rotation dial.

Furthermore, when a playback start position is specified or when a still picture at a desired position in a played video is output, the playback direction may be frequently switched between the forward playback and the reverse playback by using the above-described shuttle dial operation or the jog dial operation. In this case, since the cache memory does not hold the data that are outputted from the cache memory, the data must be reread from the disk memory medium just after the switching of the playback direction, and thus, an improvement of data transfer by prereading cannot be expected.

The present invention is made to solve the above-described problems. An object of the present invention is therefore to provide a disk memory device which is able to improve data transfer by data prereading, even when a trick play, such as a reverse playback or fast a playback, is carried out.

SUMMARY OF THE INVENTION

According to the present invention, a disk memory device comprises: a command history information storage means for holding historic information of read commands as information for reading data that are recorded on a disk memory medium, which read commands are received from a host device; a continuity detection means for detecting a direction along which prereading of data is to be carried out based on the read commands stored in the command history information storage means; a prereading area decision means for deciding the position and size of data to be preread on the disk memory medium based on the stored read commands and the data prereading direction detected by the continuity detection means; a cache memory for holding preread data; and a prereading startup means for reading the data to be preread, which is decided by the prereading area decision means, from the disk memory medium, and for storing the data in the cache memory. Therefore, even when data are to be continuously read out from the disk memory medium in the backward direction, i.e., in the direction along which the address decreases, prereading of these data can be carried out, and thus continuous reading of data in the backward direction can be carried out at a high speed.

Furthermore, according to the present invention, a disk memory device comprises: a command history information storage means for holding historic information of read commands as information for reading data that are recorded on a disk memory medium, which read commands are received from a host device; a continuity detection means for detecting an area-to-area distance which is an interval of data to be preread based on the read commands stored in the command history information storage means; a prereading rule holding means for holding prereading rules for performing prereading of data; a prereading rule decision means for deciding a prereading rule to be used for prereading of data based on the read commands, the area-to-area distance detected by the continuity detection means, and the prereading rules held by the prereading rule holding means; a prereading area decision means for deciding the position and size of data to be preread on the disk memory medium based on the prereading rule decided by the prereading rule decision means; a cache memory for holding preread data; and a prereading startup means for reading the data to be preread, which is decided by the prereading area decision means, from the disk memory medium, and for storing the data into the cache memory. Accordingly, prereading of required data can be carried out in response to continuous read commands for data areas which are separately located at equal intervals. Therefore, even when data which are located separately at equal intervals are to be continuously read out, such as a fast playback of data that are stored on a disk memory medium, prereading of unnecessary data is avoided, and thus the cache memory can be effectively utilized.

Furthermore, according to the present invention, a disk memory device comprises: a command history information storage means for holding historic information of read commands as information for reading data that are recorded on a disk memory medium, which read commands are received from a host device; a continuity detection means for detecting a direction along which prereading of data is to be carried out and an area-to-area distance which is an interval of data to be preread based on the read commands stored in the command history information storage means; a prereading rule holding means for holding prereading rules for performing prereading of data; a prereading rule decision means for deciding a prereading rule to be used for prereading of data based on the read commands, the data prereading direction and the area-to-area distance which are detected by the continuity detection means, and the prereading rules held by the prereading rule holding means; a prereading area decision means for deciding the position and size of data on the disk memory medium to be preread based on the prereading rule decided by the prereading rule decision means; a cache memory for holding preread data; and a prereading startup means for reading the data to be preread, which is decided by the prereading area decision means, from the disk memory medium, and for storing the data into the cache memory. Accordingly, prereading of required data can be carried out in response to continuous read commands for data areas which are separately located at equal intervals in the backward direction, i.e., the direction along which the address decreases. Therefore, even when data which are located separately at equal intervals in the backward direction are to be continuously read out, such as a fast-reverse playback of data that are stored on a disk memory medium, prereading of unnecessary data is avoided, and thus the cache memory can be utilized effectively.

Furthermore, according to the present invention, in the above-described disk memory device, the prereading rule holding means holds a plurality of prereading rules. Moreover, when there are a prereading rule which is decided by the prereading rule decision means and a prereading rule which has been employed immediately before the decided prereading rule and, further, the prereading directions of these prereading rules are the same, the prereading area decision means decides the position and size of data on the disk memory medium to be preread by employing both of the prereading rules in combination. Therefore, even when the data playback speed is switched from the current playback speed to the just-previous playback speed, required data have already been preread at the just-previous playback speed, and thus the required data can be transferred to the host device without needing to reread the data from the disk memory medium after the playback speed has been switched to the just-previous speed.

Furthermore, according to the present invention, the above-described disk memory device further comprises: a cache memory pointer holding means for holding an under-transfer address indicating the position, on the cache memory, of data which is currently being transferred to the host device, and a next preread data storage start address indicating the position on the cache memory where next preread data is to be stored; and a prereading startup judgement means for judging whether or not prereading of data is to be performed so as to leave at least several blocks of data which have already been transferred to the host device, on the cache memory, by employing the under-transfer address and the next preread data storage start address which are held by the cache memory pointer holding means. Therefore, even when data playback is carried out while frequently switching the playback direction between the forward direction and the backward direction, the data which have already been transferred to the host device just before the switching of the playback direction can be stored in the cache memory at the point of time when the playback direction is switched. Accordingly, the already-transferred data just before the switching of the playback direction, which data are required for the playback immediately after the switching of the playback direction, can be transferred to the host device without needing to reread the data from the disk memory medium.

Furthermore, according to the present invention, in the above-described disk memory device, data in plural prereading areas which have been successively read out in the backward direction are stored in a backward-direction area in an address space on the cache memory so that the continuity of the data is maintained. Therefore, the data in the plural prereading areas, which have been successively read out in the backward direction, are arranged in the cache memory by continuous addressing, and thus the data that are stored in the cache memory can be managed easily. Further, when the data in the prereading areas existing on the cache memory are returned to the host device, the data in the prereading areas existing on the cache memory can be extracted without being distinguished from the data in the forward direction.

BRIEF DESCRIPTION OF THE DRAWINGS

FIG. 14 is a diagram illustrating an example of a data structure in a read command record table.

DETAILED DESCRIPTION OF THE INVENTION

First Embodiment

Hereinafter, a disk memory device according to a first embodiment of the present invention will be described with reference to FIGS. 1 to 10.

Figure 1:
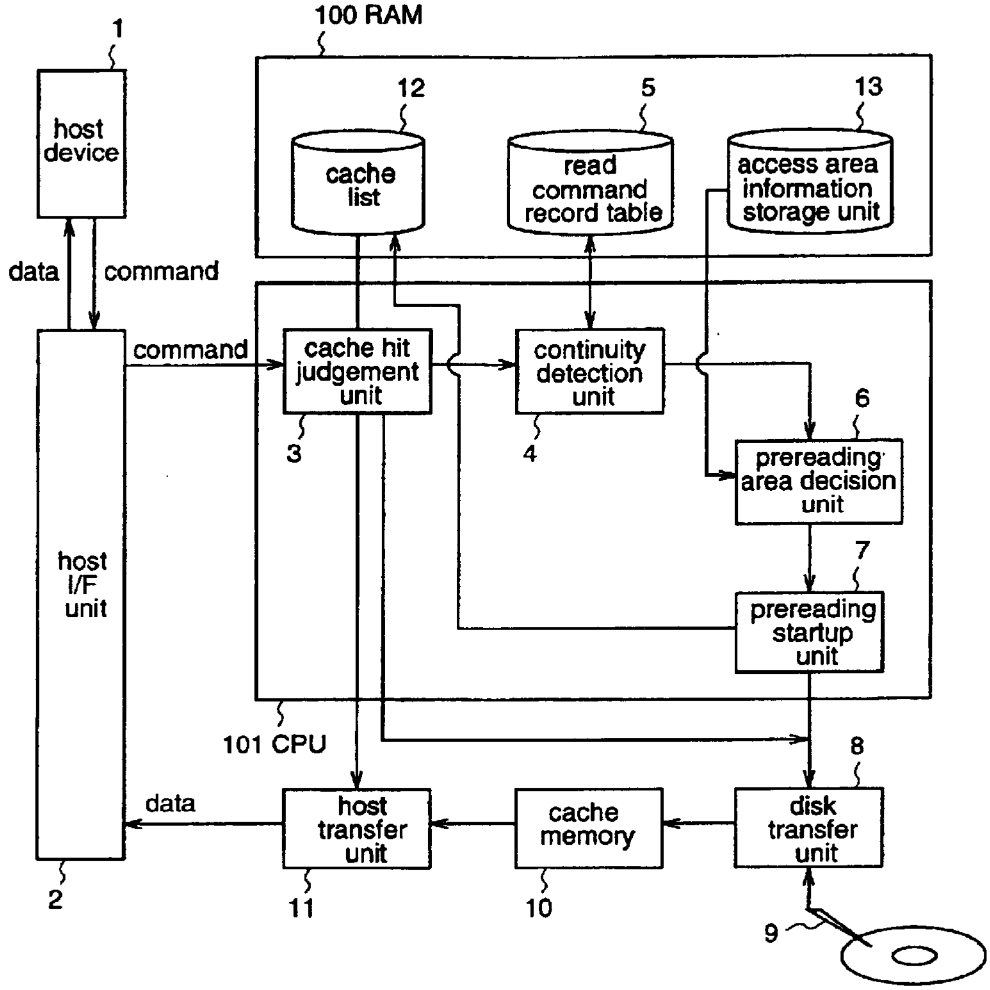
FIG. 1 is a block diagram illustrating an example of a construction of a disk memory device according to a first embodiment of the present invention.

FIG. 1 is an example of a block diagram illustrating the construction of the disk memory device according to the first embodiment of the present invention. In FIG. 1, a host device 1 outputs a read command for reading data that are recorded in a disk memory medium to the disk memory device.

Further, the disk memory device according to the first embodiment of the present invention comprises a host I/F unit 2, a cache hit judgement unit 3, a continuity detection unit 4, a read command history (record) table 5 as a command history information storage means, a prereading area decision unit 6, a prereading startup unit 7, a disk transfer unit 8, a head structure 9, a cache memory 10, a host transfer unit 11, a cache list 12, and an access area information storage unit 13.

The cache hit judgement unit 3 performs an inspection as to whether data corresponding to the read command, which is received from the host device 1 through the host I/F unit 2, exists on the cache memory 10 or not.

The continuity detection unit 4 calculates an access direction along which data prereading is to be carried out by employing the history of read commands that are stored in the read command history table 5, which is a command history information storage means.

The read command history table 5, as the command history information storage means, holds the historic information of the read commands that are transmitted from the host device 1.

As described below, the access area information storage unit 13 stores access area information relating to an access area on the disk memory medium for data that are recorded on the disk memory medium.

The prereading area decision unit 6 decides the position and size of a data area on the disk memory medium where prereading is to be carried out based on the read command, the result of the detection by the continuity detection unit 4, and the access area information that is stored in the access area information storage unit 13.

The prereading startup unit 7 instructs the disk transfer unit 8 to read out data in the data area to be preread, which is decided by the prereading area decision unit 6, from the disk memory medium, and to store the read data in the cache memory 10.

The disk transfer unit 8 outputs the data that are read from the disk memory medium through the head structure 9 to the cache memory 10.

The cache memory 10 holds (stores) the preread data.

The host transfer unit 11 transfers the data that are read from the disk memory medium 11 to the host device 1 through the host I/F unit 2.

The cache list 12 holds the list of the data that are stored in the cache memory 10.

The access area information storage unit 13 holds the access area information relating to the access area on the disk memory medium which was accessed at the previous prereading.

Next, the fundamental operation of the disk memory device according to the first embodiment of the present invention will be described with reference to a flowchart shown in FIG. 2.

Upon receipt of a read command from the host device 1 through the host I/F unit 2, the cache hit judgement unit 3 searches the cache list 12 to check whether the requested data exists in the cache memory 10 or not, as the fundamental process of the reading operation (step S1).

When the requested data exists in the cache memory 10, the host transfer unit 11 transfers the data in the cache memory 10 through the host I/F unit 2 to the host device 1 (step S3).

When the requested data does not exist in the cache memory 10, the disk transfer unit 8 is instructed to read the requested data from the disk 11 through the head structure 9 onto the cache memory 10 (step S2), and the host transfer unit 11 simultaneously transfers the requested data through the host I/F unit 2 to the host device 1 (step S3).

Figure 3:
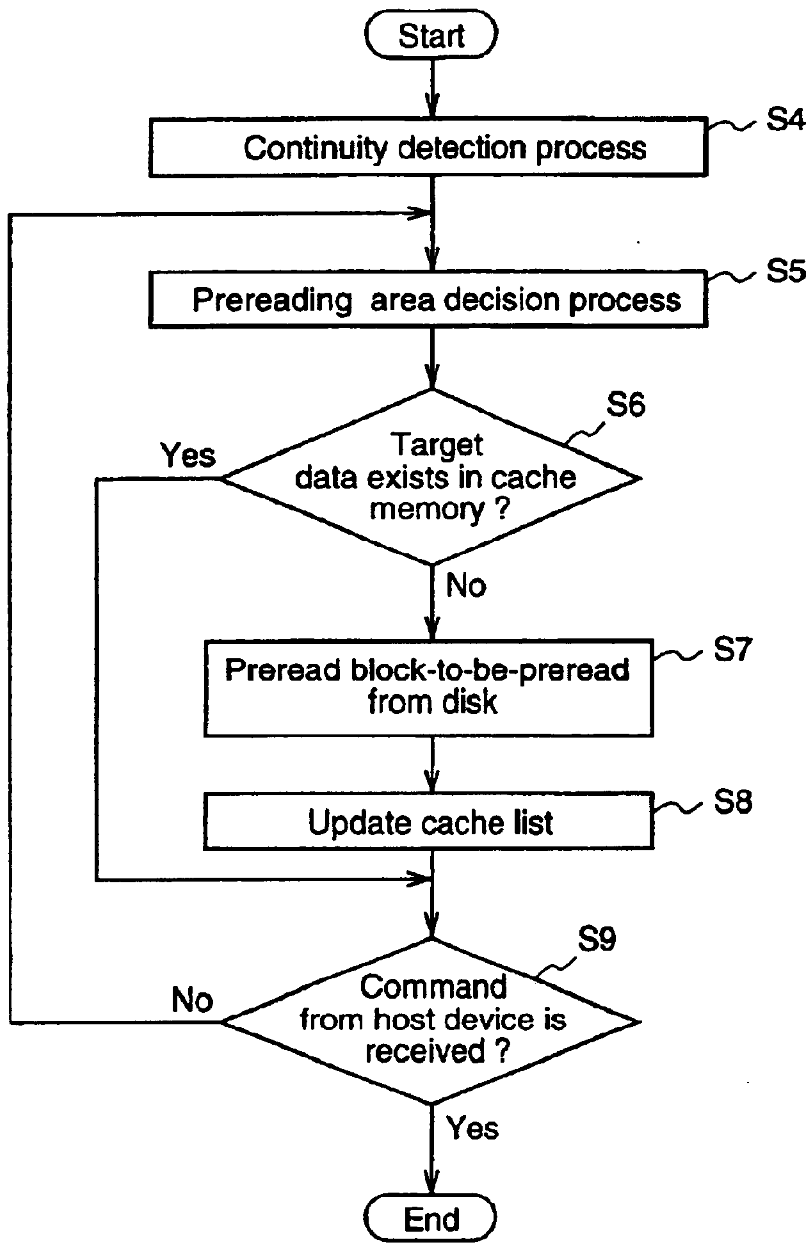
FIG. 3 is a flowchart illustrating an example of a prereading process that is performed by the disk memory device according to the first embodiment of the present invention.

Next, the data prereading process that is to be performed simultaneously with the above-mentioned fundamental process by the disk memory device will be described with reference to FIG. 3.

Figure 2:
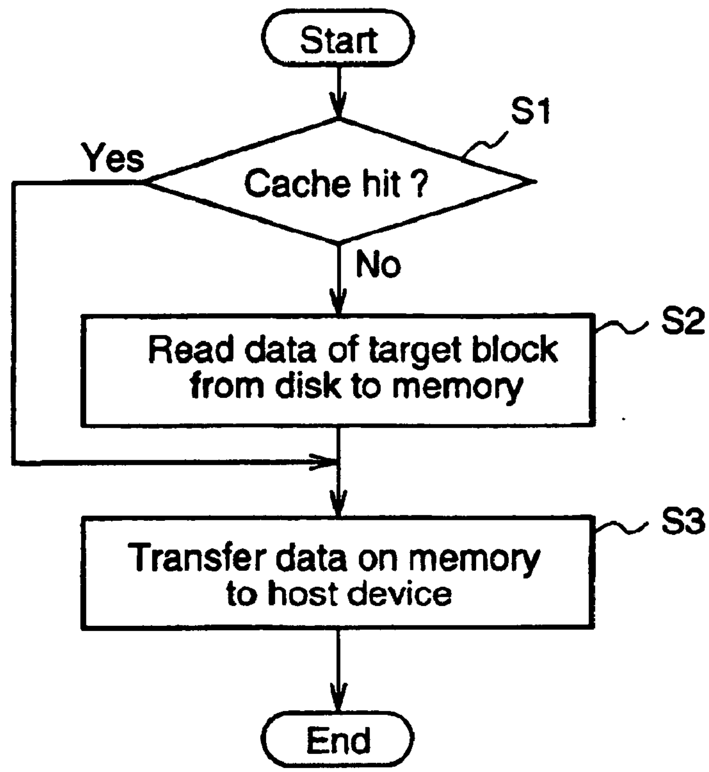
FIG. 2 is a flowchart illustrating an example of a fundamental process of the disk memory device according to the first embodiment of the present invention.

While executing the fundamental process which has been described by employing the flowchart shown in FIG. 2, the continuity detection unit 4, which has received the read command from the host device 1 through the host I/F unit 2 and the cache hit judgement unit 3, performs a continuity detection process for calculating an access direction value indicating an access direction based on the position of the data area which was requested by the last read command that is stored in the read command history table 5 as a command history information storage means, and the position of the data area which is requested by the present read command (step S4).

Next, the prereading area decision unit 6 performs a prereading area decision process for deciding the position and size of a data area on the disk memory medium where prereading is to be carried out based on the position and size of the data area which is requested by the present read command, and the access direction value that is detected by the continuity detection unit 4 (step S5).

Next, the prereading startup unit 7 searches the cache list 12 to check whether data in the prereading area that is decided by the prereading area decision unit 6 exists in the cache memory 10 or not (step S6).

When the data in the prereading area that is decided by the prereading area decision unit 6 does not exist in the cache memory 10, the prereading startup unit 7 instructs the disk transfer unit 8 to read the data in the prereading area that is decided by the prereading area decision unit 6, thereby performing prereading of data (step S7). After the prereading of data, the prereading startup unit 7 performs a process of updating the cache list 12 which shows the details of the data existing in the cache memory 10 (step S8).

On the other hand, when the data in the prereading area that is decided by the prereading area decision unit 6 exists on the cache memory 10, the data prereading process is ended.

The above-mentioned data prereading process, i.e., the step of deciding a prereading area and the following steps (steps S5 to S8), is repeated until a new command from the host device 1 is received, thereby continuing the prereading of data (step S9).

Next, the continuity detection process that is performed by the continuity detection unit 4 in step S4 shown in FIG. 3 will be described with reference to FIGS. 4 and 5.

Figures 4, 5:
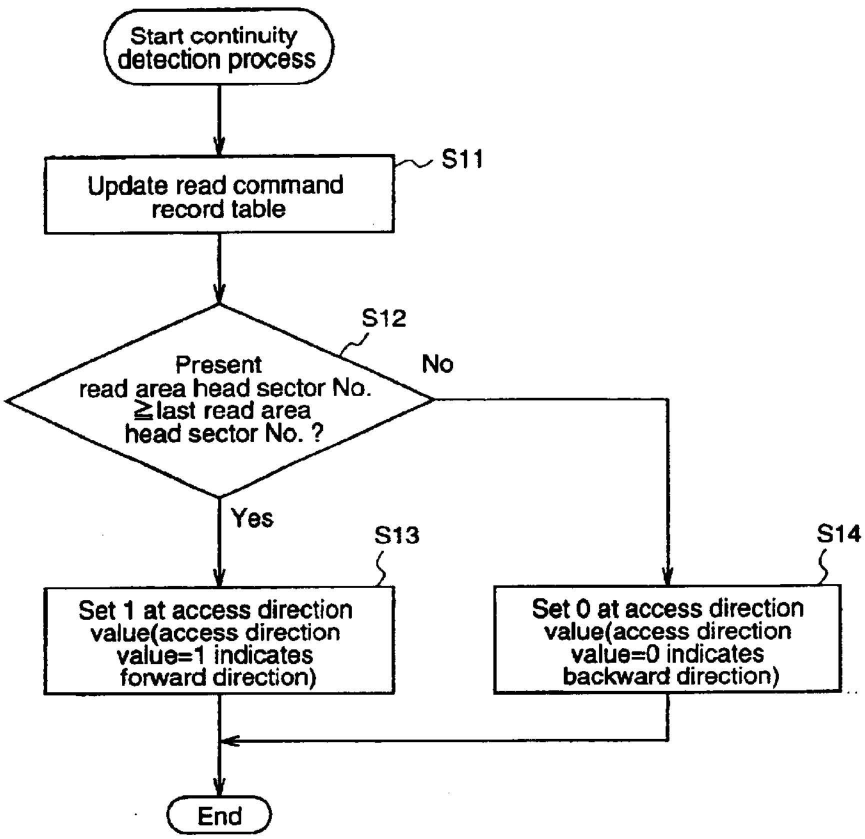
FIG. 4 is a flowchart illustrating an example of a continuity detection process that is performed by the disk memory device according to the first embodiment of the present invention.
FIG. 5 is a diagram illustrating an example of a data structure in a read command record table.

FIG. 4 is a flowchart for explaining the operation of the continuity detection unit 4 of the disk memory device according to the first embodiment of the present invention, and FIG. 5 shows examples of read commands that are stored in the read command history table 5.

Initially, the continuity detection unit 4 performs updation of the read command history table 5. This updation is carried out as follows. In FIG. 5, a last read area head sector No. (number) A is set at a last-but-one read area head sector No. C, a last read area size B is set at a last-but-one read area size D, a present read area head sector No. G is set at the last read area head sector No. A, a present read area size H is set at the last read area size B, a head sector No. of a read area corresponding to the read command that is received from the host device 1 is set at the present read area head sector No. G, a read area size corresponding to the read command that is received from the host device 1 is set at the present read area size H, and a present access direction value I is set at a last access direction value E, whereby the read command history table updation process is completed (step S11).

Next, the continuity detection unit 4 compares the present read area head sector No. G which is received from the host 6 device 1 with the last read area head sector No. A which is updated in step S46 (step S12) so as to calculate an access direction. At this time, the access direction is indicated by binary digits. "1" is set as the present access direction value I shown in FIG. 5 when the access direction is the forward direction, while "0" is set as the value I when the access direction is the backward direction (step S13 or step S14), whereby the continuity detection process is completed.

Next, the prereading area decision unit 6 decides a prereading area sector No. indicating a position on the disk memory medium where prereading is to be started and a prereading area size which is the size of data to be preread based on the present read area head sector No. and the present read size which are requested by the present read command, and the access direction value that is detected by the continuity detection unit 4.

Hereinafter, the prereading read decision process that is performed by the prereading area decision unit 6 in step S5 shown in FIG. 3 will be described with reference to FIGS. 6 and 7.

Figures 6, 7:
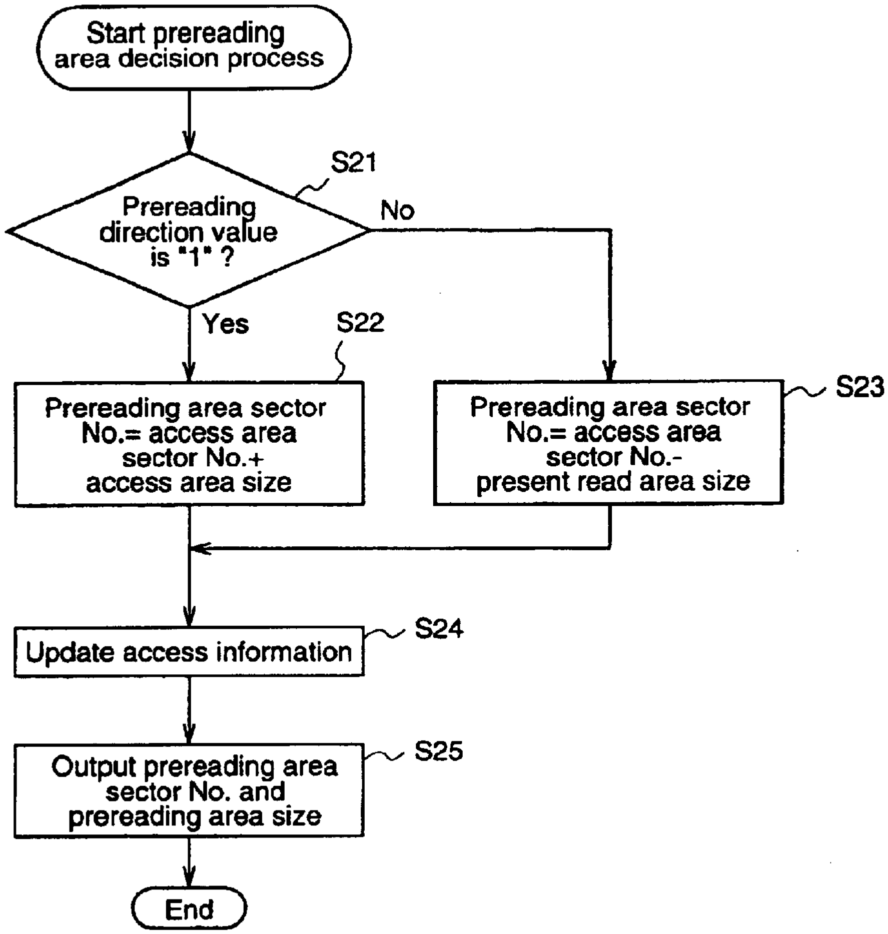
FIG. 6 is a flowchart illustrating an example of a prereading area decision process that is performed by the disk memory device according to the first embodiment of the present invention.
FIG. 7 is a diagram illustrating an example of an access area information that is stored in an access area information storage unit.

FIG. 6 is a flowchart for explaining the operation of the prereading area decision unit 6 of the disk memory device according to the first embodiment of the present invention, and FIG. 7 is a diagram illustrating an example of access area information that is stored in the access area information storage unit 13. In FIG. 7, the access area information is composed of an access area head sector No. Q which is the head sector No. of a data area on the disk memory medium where the last prereading has been performed, and an access area size R which is the size of data that is preread by the most recent prereading.

In FIG. 6, the prereading area decision unit 6 initially checks whether or not the prereading direction value that is detected by the continuity detection unit 4 is "1" indicating a forward-direction access (step S21).

When the prereading direction value is "1", the access area size R is added to the access area head sector No. Q so as to calculate a prereading area sector No. (step S22).

When the prereading direction value is "0" indicating an backward-direction access, the prereading area size Z is subtracted from the access area head sector No. Q so as to calculate a prereading area sector No. (step S23).

When the prereading area sector No. is calculated (step S22 or step S23), the prereading area decision unit 6 updates the access area head sector No. Q that is stored in the access information storage unit 13 to the prereading area sector No. which is presently calculated, and updates the access area size R to the present read area size (step S24).

The prereading area decision unit 6 outputs the calculated prereading area sector No. and the present read area size (the prereading area size) to the prereading startup unit 7, thereby completing the prereading area decision process (step S25).

The prereading startup unit 7 searches the cache list 12 to check whether the data that is indicated by the prereading area sector No. and the prereading area size, which are outputted from the prereading area decision unit 6, exists on the cache memory 10 or not. When the corresponding data does not exist, the prereading startup unit 7 instructs the disk transfer unit 8 to read the corresponding data which is recorded on the disk memory medium and indicated by the prereading area sector No. and the prereading area size which are outputted from the prereading area decision unit 6, thereby performing prereading of data. Further, after the prereading of data, the prereading startup unit 7 performs updation of the cache list 12 so as to complete the data prereading process.

On the other hand, when the corresponding data exists, the prereading startup unit 7 performs prereading of the next data.

In this way, the area which has been accessed by the immediately preceding read command and stored in the read command history table 5 as a command history information storage means is compared with the area which is requested by the present read command, thereby deciding the direction along which prereading of the data is to be carried out. Therefore, even when the data are to be continuously read in the backward direction, i.e., the direction along which the address decreases, prereading of these data can be carried out, whereby continuous reading of the data in the backward direction can be carried out at a high speed.

Next, a method for storing the data that are read from the disk memory medium into the cache memory 10 that is performed by the disk memory device according to the first embodiment of the present invention will be described with reference to FIGS. 8 to 10.

Figure 8:
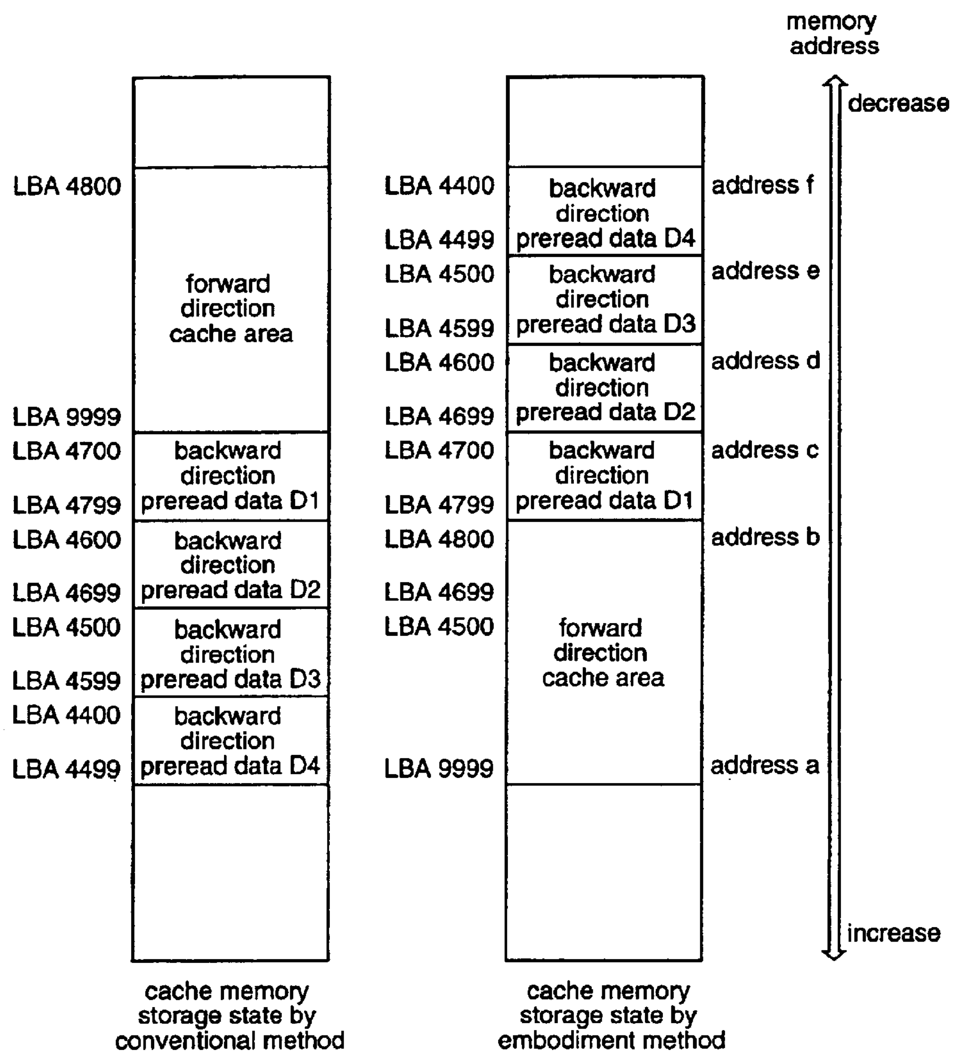
FIG. 8 is a diagram illustrating an example of a data structure in a cache memory.

FIG. 8 is a diagram illustrating the storage states of the cache memory 10 in the case where data are stored by employing the conventional storage method and the storage method of the present invention, respectively. As shown in FIG. 8, in the method of reading the data in the prereading area from the disk memory medium and storing the read data into the cache memory 10, when the backward-direction preread data are stored in the cache memory employing the conventional data storage method, the backward-direction preread data D1, D2, D3, and D4 are successively stored after the forward-direction cache data (in the direction along which the memory address increases).

In this case, the boundary between the backward-direction preread data D1 (LBA 4700-LBA 4799) and the backward-direction preread data D2 (LBA 4600-LBA 4699) is LBA 4799 and LBA 4600, whereby discontinuity of data occurs. This discontinuity will occur among all areas. In order to solve this problem, in the conventional data storage method, it is necessary to form, for every area, a cache entry as shown in FIG. 9 which is entry information into the cache memory, and to enter the cache entries so formed.

On the other hand, in the data storage method according to the present invention, the data in the plural prereading areas, which have been successively read in the backward direction, are successively stored in the backward-direction areas in the address space on the cache memory. That is, the backward-direction preread data D1, D2, D3, and D4 are successively stored before the forward-direction cache data (the direction along which the memory address decreases).

In this case, data storage is carried out so that the boundary between the backward-direction preread data D1 (LBA 4700-LBA 4799) and the backward-direction preread data D2 (LBA 4600-LBA-4699) becomes LBA 4700 and LBA 4699, whereby the continuity of data between the respective areas can be maintained. Therefore, as shown in FIG. 10, the data that are stored in the cache memory 10 can be managed by changing only the head LBA (information in the cache entry) and the head address in the cache memory, and it is not necessary to form a new cache entry for every area, which is in contrast to the conventional data storage method.

As described above, since the data in the plural prereading areas, which have been successively read in the backward direction, are stored in the backward-direction areas in the address space on the cache memory so that the continuity of the data is maintained, the data in the plural prereading areas which have successively been read in the backward direction are arranged in the cache memory by continuous addressing, whereby the data stored in the cache memory can be easily managed. Further, when the data in the prereading areas which exist on the cache memory are returned to the host device 1, the data in the prereading areas which exist on the cache memory can be extracted without being distinguished from the forward-direction data.

Furthermore, as shown in FIG. 1, the processes of the cache hit judgement unit 3, the continuity detection unit 4, the prereading area decision unit 6, and the prereading startup unit 7 are performed by a CPU 101, and the read command history table 5, the cache list 12, and the access area information storage unit 13 are arranged on a RAM 100 which is readable and writable from the CPU 101.

Second Embodiment

Hereinafter, a disk memory device according to a second embodiment of the present invention will be described with reference to FIGS. 11 to 20.

Figure 11:
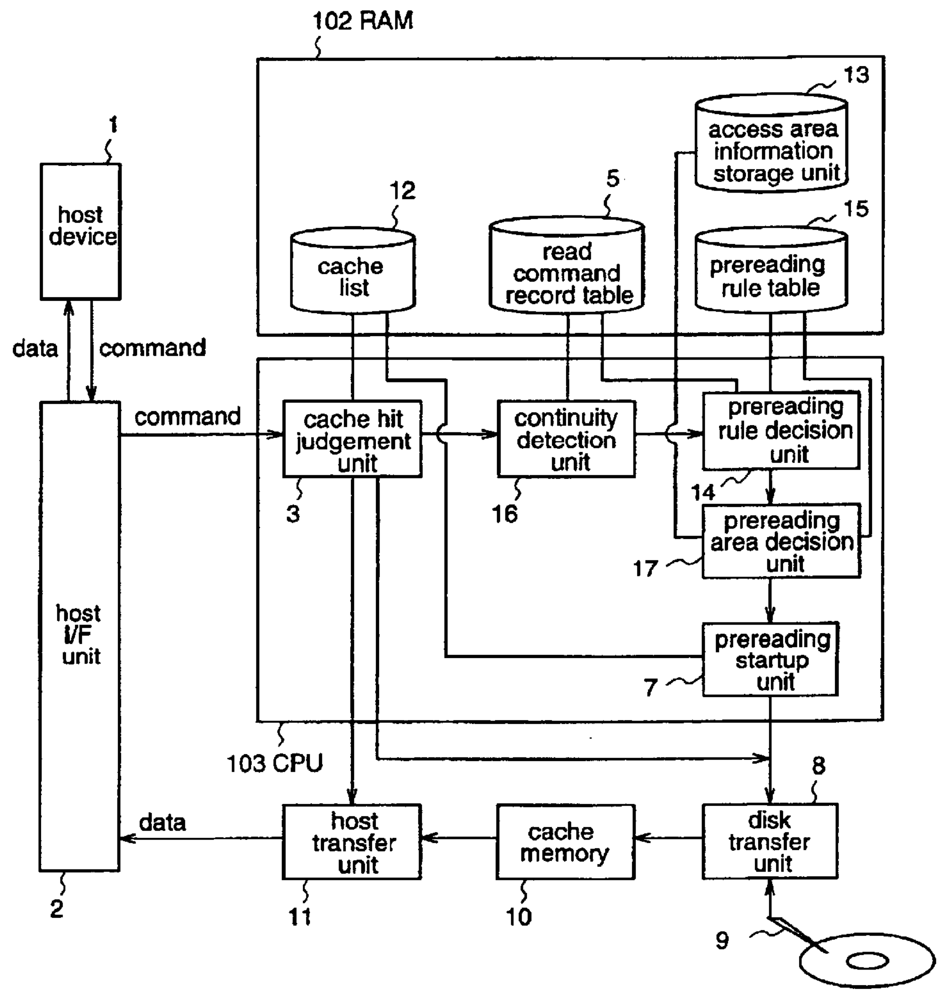
FIG. 11 is a block diagram illustrating an example of a construction of a disk memory device according to a second embodiment of the present invention.

FIG. 11 is a block diagram illustrating the construction of the disk memory device according to the second embodiment of the present invention. In FIG. 11, a host device 1 outputs a read command which instructs the disk memory device to read data that are recorded on a disk memory medium.

Further, the disk memory device according to the second embodiment of the present invention comprises a host I/F unit 2, a cache hit judgement unit 3, a continuity detection unit 16, a read command history (record) table 5 as a command history information storage means, a prereading rule decision unit 14, a prereading rule table (holding unit) 15 as a prereading rule storage means, a prereading area decision unit 17, a prereading startup unit 7, a disk transfer unit 8, a cache memory 10, a host transfer unit 11, a cache list 12, and an access area information storage unit 13.

The disk memory device according to the second embodiment of the present invention is different from the above-mentioned first embodiment which enables prereading of a read command that requests data that are located in the backward direction (i.e., the direction along which the address decreases), in that prereading of data can be effectively performed even when the disk memory device receives continuous read commands requesting data which are located separately at equal intervals. Therefore, the constituent elements of the second embodiment performing the same operations as those described for the first embodiment are given the same reference numerals, and descriptions thereof will be omitted.

The continuity detection unit 16 calculates an access direction along which prereading of data is to be carried out and an interval between areas from which data are to be read by employing the history of read commands that are stored in the read command history table 5 as a command history information storage means.

The prereading rule decision unit 14 decides a prereading rule that is to be used for prereading of data based on the read command, the data prereading direction and the area-to-area interval which are detected by the continuity detection unit 16, and the prereading rules that are stored in the prereading rule table 15 as a prereading rule storage means.

The prereading rule table 15, as a prereading rule storage means, holds the prereading rule which is decided by the prereading rule decision unit 14.

The prereading area decision unit 17 decides a position of an area on the disk memory medium where prereading is to be started and a size of the area to be preread based on the prereading rule which is decided by the prereading rule decision unit 14, and the access area information that is stored in the access area information storage unit 13.

The fundamental process of the disk memory device according to the second embodiment of the present invention is identical to the fundamental process of the disk memory device according to the first embodiment which has already been described with reference to FIG. 2 and, therefore, repeated description is not necessary.

The disk memory device according to the second embodiment of the present invention performs a data prereading process as follows, while executing the above-mentioned fundamental process.

Figure 12:
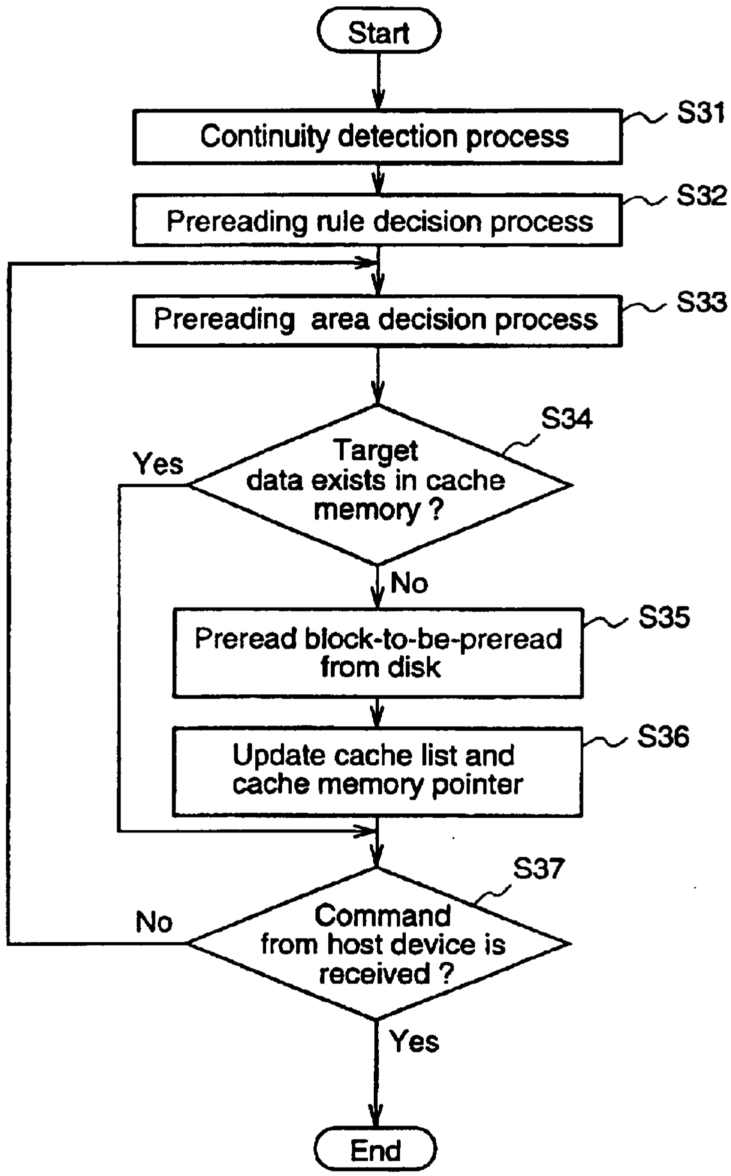
FIG. 12 is a flowchart illustrating an example of a prereading process that is performed by the disk memory device according to the second embodiment of the present invention.

Hereinafter, the data prereading process that is performed by the disk memory device according to the second embodiment of the present invention will be described with reference to FIG. 12.

While performing the fundamental process described with reference to FIG. 2, the continuity detection unit 16, which has received a read command from the host device 1 through the host I/F unit 2, performs a continuity detection process for calculating an access direction and an area-to-area interval based on the position of the data area which has been requested by the last (most recent) read command and recorded in the read command history table 5 as a command history information storage means, and the position of the data area which is requested by the present read command (step S31).

Next, the prereading rule decision unit 14 performs a prereading rule decision process for deciding a prereading rule that is to be employed for prereading of data based on the access direction and the area-to-area interval which are calculated by the continuity detection unit 16, and the data area size which is presently requested (step S32). The decided prereading rule is stored in the prereading rule table 15 as a prereading rule storage means.

The prereading area decision unit 17 decides a prereading rule that is to be applied to the prereading of data by performing a previous rule application decision process for deciding whether or not the prereading of data is to be carried out in combination with a previous prereading rule which has been employed before the prereading rule to be employed according to the present read command, and performs a prereading area decision process for deciding the position and size of a data area on the disk memory medium where prereading is to be carried out, based on the decided prereading rule (step S33).

Next, the prereading startup unit 7 searches the cache list 12 so as to check whether the data in the prereading area that is decided by the prereading area decision unit 17 exists in the cache memory 10 or not (step S34).

When the data in the prereading area that is decided by the prereading area decision unit 17 does not exist in the cache memory 10, the prereading startup unit 7 instructs the disk transfer unit 8 to read the data in the prereading area that is decided by the prereading area decision unit 17, thereby performing prereading of data (step S35). Further, after the prereading of data, the prereading startup unit 7 performs updation of the cache list 12 so as to indicate the details of the data that are stored in the cache memory 10 (step S36).

On the other hand, when the data in the prereading area that is decided by the prereading area decision unit 17 exists in the cache memory 10, prereading of this data is completed.

The prereading area decision process in step 33 and the following processes are repeated until the disk memory device receives a new command from the host device 1, whereby prereading of data is proceeded with (step S37).

Next, the continuity detection process that is performed by the continuity detection unit 16 in step S31 shown in FIG. 12 will be described with reference to FIGS. 13 and 14.

Figure 13:
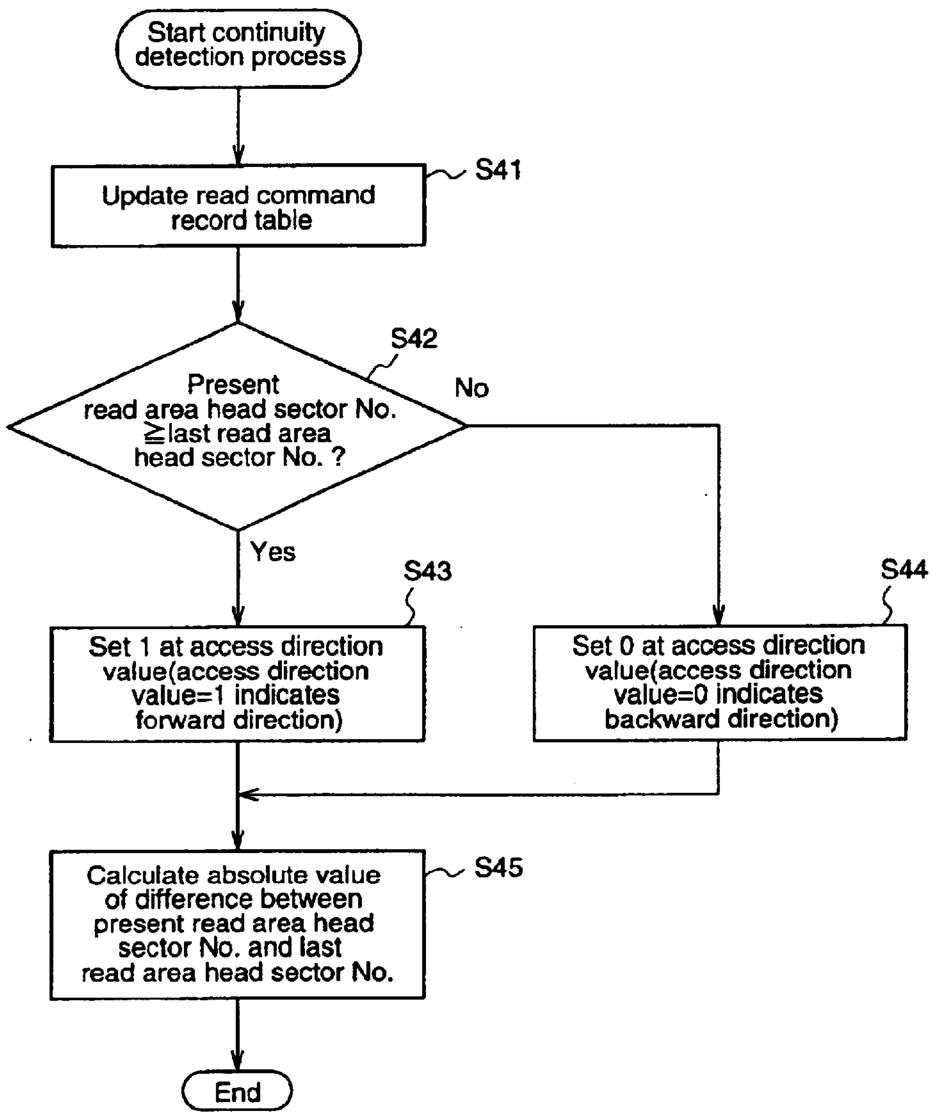
FIG. 13 is a flowchart illustrating an example of a continuity detection process that is performed by the disk memory device according to the second embodiment of the present invention.

FIG. 13 is a flowchart for explaining the operation of the continuity detection unit 16 of the disk memory device according to the second embodiment of the present invention, and FIG. 14 is a diagram illustrating examples of read commands which are stored in the read command history table 5.

Initially, the continuity detection unit 16 performs updation of the read command history table 5 (step 541).

This updation is performed as follows. As illustrated in FIG. 14, a last read area head sector No. A is set at a last-but-one read area head sector No. C, a last read area size B is set at a last-but-one read area size D, a present read area head sector No. G is set at the last read area head sector No. A, a present read area size H is set at the last read area size B, a head sector No. of a read area corresponding to the read command that is received from the host device 1 is set at the present read area head sector No. G, a read area size corresponding to the read command that is received from the host device 1 is set at the present read area size H, a present access direction value I is set at a last access direction value E, and a present area-to-area interval (distance) J is set at a last area-to-area interval F, thereby completing updation of the read history table 5.

Next, the continuity detection unit 16 compares the present read area head sector No. G which is received from the host device 1 with the last read area head sector No. A which is updated in step S41 (step S42) so as to calculate an access direction. At this time, the access direction is indicated by binary digits. "1" is set at the present access direction value I shown in FIG. 14 as an access direction indicating value when the access direction is the forward direction, while "0" is set as an access direction value when the access direction is the backward direction (step S43 or step S44).

Thereafter, the continuity detection unit 16 calculates the absolute value of a difference between the present read area head sector No. G and the last read area head sector No. A, and sets the absolute value as an area-to-area interval at the present area-to-area interval J (step S45), thereby completing the continuity detection process.

Next, the prereading rule decision process that is performed by the prereading rule decision unit 14 in step S32 shown in FIG. 12 will be described with reference to FIGS. 15 and 16.

Figure 15:
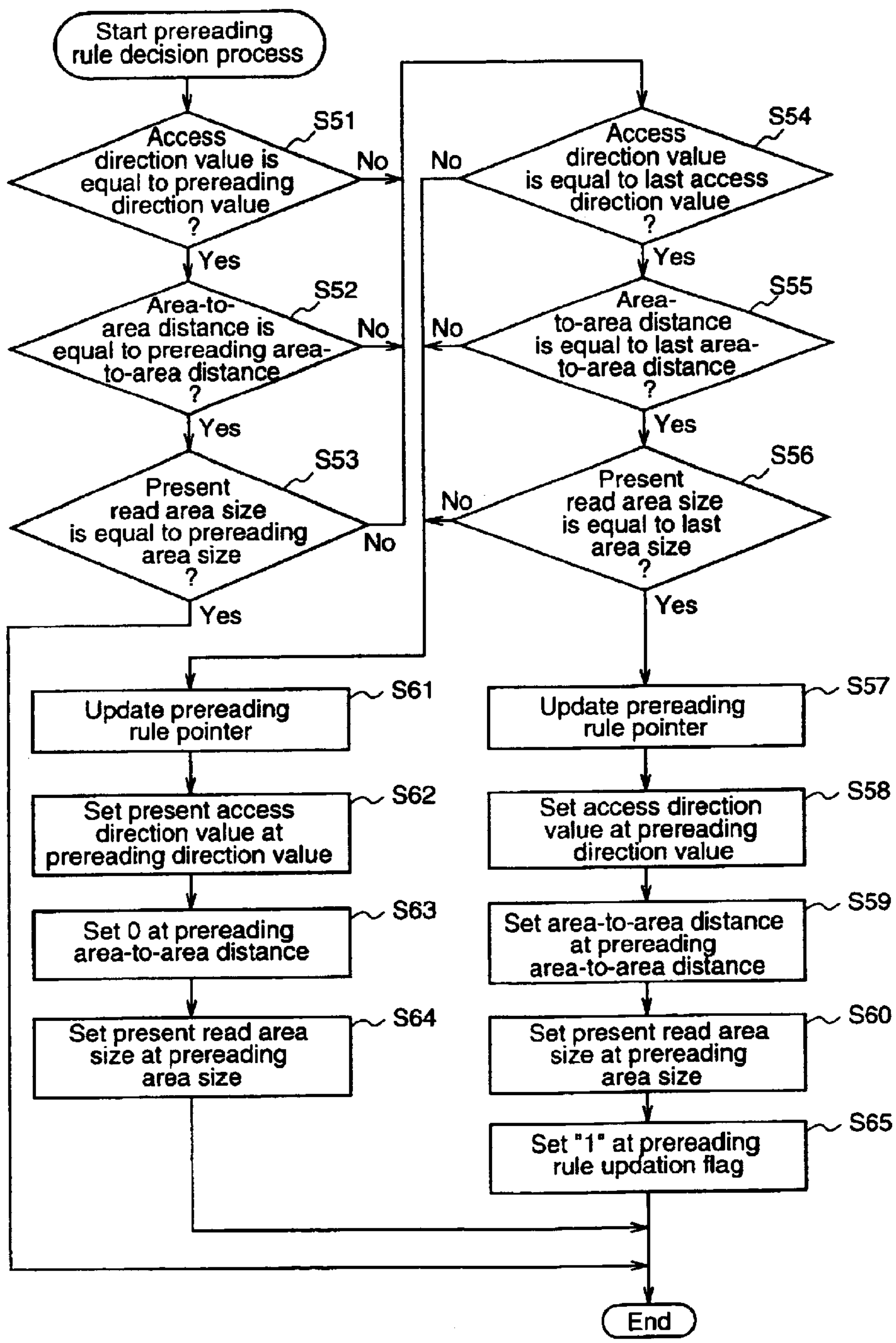
FIG. 15 is a flowchart illustrating an example of a prereading rule decision process that is performed by the disk memory device according to the second embodiment of the present invention.
Figure 16:
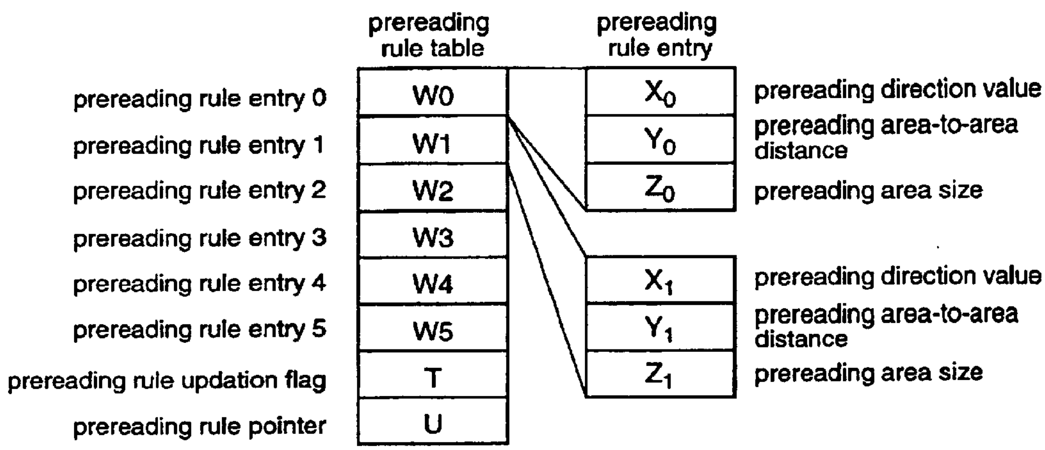
FIG. 16 is a diagram illustrating an example of a data structure in a prereading rule table.

FIG. 15 is a flowchart for explaining the operation of the prereading rule decision unit 14 of the disk memory device according to the second embodiment of the present invention, and FIG. 16 is a diagram illustrating examples of prereading rules that are stored in the prereading rule table 15.

Prereading rule entries W0 to W5 constitute a group of prereading rule entries which are stored in the prereading rule table 15, and each prereading rule entry is composed of a prereading direction value X, a prereading area-to-area interval (distance) Y, and a prereading area size Z. Further, a prereading rule updation flag T is a flag indicating that the prereading rule is updated, and this flag T indicates that the previous rule exists at the same time. It is assumed that, as a binary digit, "1" is set when the prereading rule is updated, while "0" is set when the prereading rule is not updated. A prereading rule pointer U indicates a prereading rule entry which is currently being employed.

In the flowchart of FIG. 15, the prereading rule decision unit 14 initially decides whether the read command, which has been supplied from the host device 1 to the disk memory device, matches the present prereading rule or not. To be specific, the prereading rule decision unit 14 decides: whether the present access direction value which is calculated in the continuity detection process (refer to steps S43 and S44 in FIG. 13) matches the prereading direction X of the present prereading rule which is pointed to by the prereading rule pointer U that is stored in the prereading rule table 15 (refer to FIG. 16) (step S51); whether the present area-to-area interval which is calculated in the continuity detection process (refer to step S45 in FIG. 13) matches the prereading area-to-area interval Y of the current prereading rule which is pointed to by the prereading rule pointer U that is stored in the prereading rule table 15 (refer to FIG. 16) (step S52); and whether the present read area size which is received from the host device 1 matches the prereading area size Z of the present prereading rule which is pointed to by the prereading rule pointer U that is stored in the prereading rule table 15 (refer to FIG. 16) (step S53).

When all of these decisions (steps S51 to S53) are "match", since the present prereading rule can be applied, the present prereading rule is applied as it is without being changed.

On the other hand, based on the decisions (steps S51 to S53), when it is decided that the presently applied rule cannot be applied to the present read command, the last (most recent) read command is compared with the present read command so as to decide whether a new prereading rule can be decided or not.

To be specific, the prereading rule decision unit 14 decides: whether the present access direction value which is calculated in the continuity detection process (refer to steps S43 and S44 in FIG. 13) matches the last access direction value E which is recorded in the read command history table 5 (refer to FIG. 14) (step S54); whether the present area-to-area interval which is calculated in the continuity detection process (refer to step S45 in FIG. 13) matches the last area-to-area interval F which is recorded in the read command history table 5 (refer to FIG. 14) (step S55); and whether the present read area size which is received from the host device 1 matches the last read area size B which is recorded in the read command history table 5 (refer to FIG. 14) (step S56).

When all of these decisions (steps S54 to S56) are "match", the prereading rule pointer U in the prereading rule table 15 is updated to a new prereading rule (step S57), and the present access direction is set at the prereading direction value X of the prereading rule entry that is pointed to by the updated prereading rule pointer U on the prereading rule table 15 (step S58), the present area-to-area interval is set at the prereading area-to-area interval Y (step S59), and the present read area size is set at the prereading area size Z (step S60), whereby the prereading rule is updated.

When the updation of the prereading rule is completed, "1" is set at the prereading rule updation flag T on the prereading rule table 15 so as to complete the prereading rule decision process (step S65).

On the other hand, based on the decisions (steps S54 to S56), when at least one of the decisions is "mismatch", since a new prereading rule cannot be applied, setting for prereading continuous data from the present read area is performed. To be specific, the prereading rule pointer U on the prereading rule table 15 is updated (step S61), and setting for prereading continuous data from the present read area is made to the prereading rule entry which is pointed to by the updated prereading rule pointer U on the prereading rule table 15. That is, the present access direction value (steps S43 and S44 in FIG. 13) is set at the prereading direction value X on the 1 prereading rule table 15 (step S62), "0" is set as an area-to-area interval at the prereading area-to-area interval Y (step S63), and the present read area size is set at the prereading area size Z (step S64), whereby the prereading rule is updated so as to complete the prereading rule decision process. In this case, updation of the prereading rule updation flag T on the prereading rule table 15 is not carried out.

Furthermore, while the prereading rule storage unit 15 of the disk memory device according to the second embodiment has five prereading entries, the present invention is not restricted thereto, and the storage unit 15 may have at least one prereading entry.

Next, the prereading rule pointer updation processes that is performed by the prereading rule decision unit 14 in steps S57 and S61 shown in FIG. 15 will be described with reference to FIG. 17.

Figure 17:
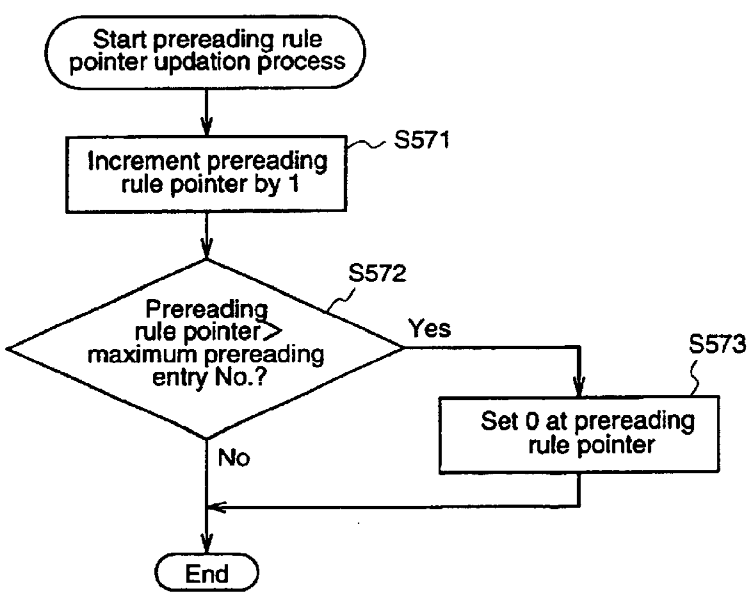
FIG. 17 is a flowchart illustrating an example of a prereading rule pointer updation process that is performed by the disk memory device according to the second embodiment of the present invention.

FIG. 17 is a flowchart for explaining the rule pointer updation process that is performed by the prereading rule decision unit 14 of the disk memory device according to the second embodiment of the present invention.

The prereading rule pointer updation processes in steps S57 and S61 are processes for advancing, by one entry, the prereading rule pointer which points the present prereading rule entry in the prereading rule entry group constituted like a ring buffer, and these processes are identical to each other.

In the prereading rule pointer updation process that is performed by the prereading rule decision unit 14, the prereading rule pointer U on the prereading rule table 15 is initially incremented by 1 (step S571).

Next, the prereading rule pointer U is compared with the maximum prereading rule entry number, which is 5 in FIG. 16 (step S572). When the prereading rule pointer U is larger than the maximum prereading rule entry number, "0" is set at the prereading rule pointer U (step S573).

Next, the previous rule application decision process, which is included in the prereading area decision process that is performed by the prereading area decision unit 17 in step S33 shown in FIG. 12, will be described with reference to FIGS. 16 and 18.

The previous rule application decision process aims to, even when the data playback speed is changed from the present playback speed to the just-previous playback speed, perform prereading of required data at the changed playback speed, and this process enables the transfer of required data to the host device without rereading the required data from the disk memory medium after the playback speed is changed to the just-previous playback speed.

Figure 18:
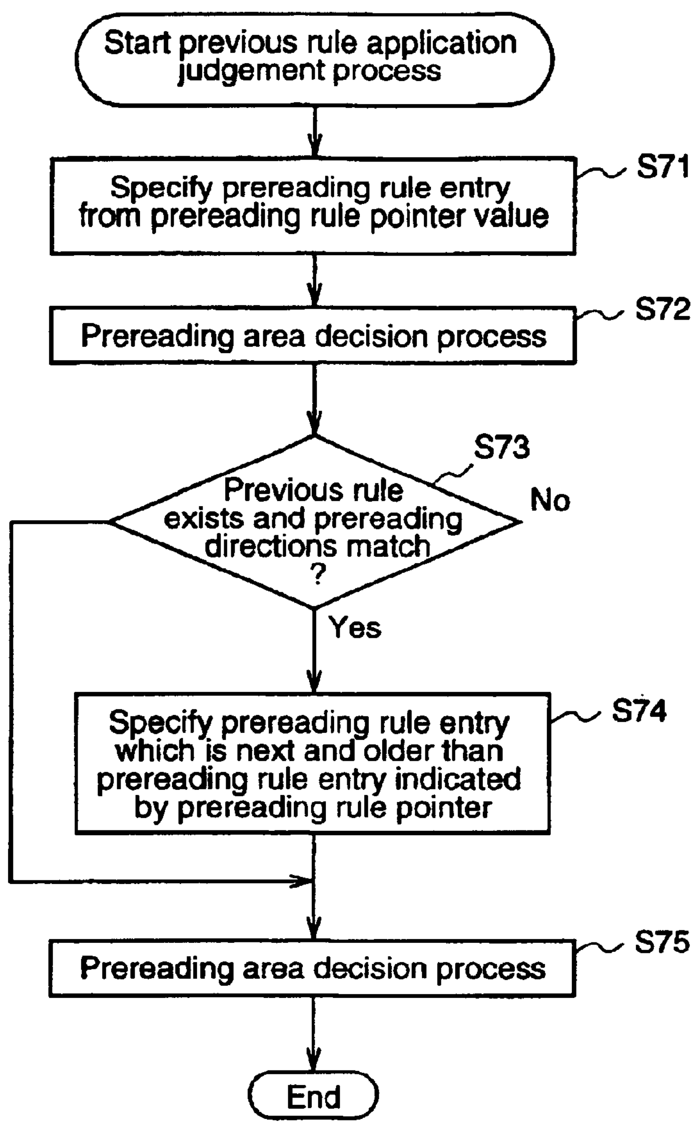
FIG. 18 is a flowchart illustrating an example of a previous rule application judgement process that is performed by the disk memory device according to the second embodiment of the present invention.

FIG. 18 is a flowchart for explaining the previous rule application decision process that is performed by the prereading area decision unit 17 of the disk memory device according to the second embodiment of the present invention.

Initially, the prereading area decision unit 17 specifies a prereading rule entry which is pointed to by the prereading rule pointer U from among the prereading rule entries W0–W5 on the prereading rule table 15 shown in FIG. 16 (step S71). The following description will be made on assumption that the prereading rule entry pointed by the prereading rule pointer U is W1.

Next, the prereading area decision unit 17 performs a prereading area decision process for deciding the position and size of a data area on the disk memory medium where prereading is to be carried out based on the prereading rule which is specified in step S71, i.e., a prereading direction value $X_1$, a prereading area-to-area interval $Y_1$, and a prereading area size $Z_1$ (step S72).

Next, the prereading area decision unit 17 decides whether or not there is a previous prereading rule which has been employed before the presently employed prereading rule and whether the prereading directions of the previous and present rules match or not, according to whether or not "1" is set at the prereading rule updation flag T on the prereading rule table 15 and whether the prereading direction value $X_1$ of the prereading rule entry which is pointed to by the prereading rule pointer U matches the prereading direction value $X_0$ of the prereading rule entry which has been recorded just before the prereading direction value $X_1$ (step S73).

When a previous rule exists and the prereading direction of the previous rule matches the prereading direction of the present rule, since prereading of data is carried out by employing the previous rule, a prereading rule entry which is immediately before the prereading rule entry which is pointed to by the prereading rule pointer U on the prereading rule table 15 shown in FIG. 16 is specified (step S74).

Next, the prereading area decision unit 17 performs a prereading area decision process for deciding the position and size of a data area on the disk memory medium where prereading is to be carried out based on the prereading rule which is specified in step S74, i.e., the prereading direction value $X_0$, the prereading area-to-area interval $Y_0$, and the prereading area size $Z_0$ (step S75).

Hereinafter, the prereading area decision process that is performed by the prereading area decision unit 17 in steps S72 and S75 shown in FIG. 18 will be described with reference to FIGS. 7, 16, and 19.

Figure 19:
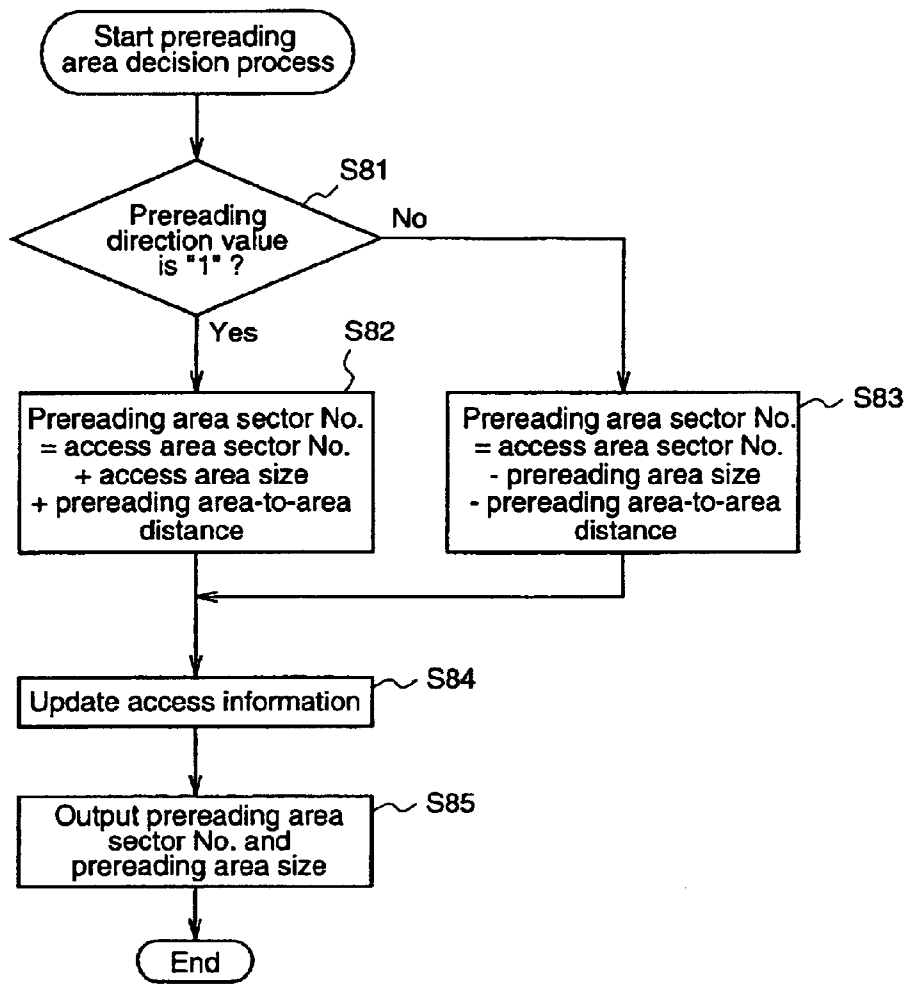
FIG. 19 is a flowchart illustrating an example of a prereading area decision process that is performed by the disk memory device according to the second embodiment of the present invention.

FIG. 19 is a flowchart for explaining the prereading area decision process that is performed by the prereading area decision unit 17 of the disk memory device according to the second embodiment of the present invention, and FIG. 7 is a diagram illustrating an example of access area information that is stored in the access area information storage unit 13. In FIG. 7, the access area information is composed of an access area head sector No. Q which is a head sector No. of a data area on the disk memory medium where the last prereading has been carried out, and an access area size R which is the size of data that are read by the last prereading.

As illustrated in FIG. 19, the prereading area decision unit 17 decides a prereading area sector No. and a prereading area size of an area to be presently preread, based on the prereading direction value X, the prereading area-to-area interval Z, and the prereading area size Z shown in FIG. 16, which are specified in the above-described previous rule application decision process, and the access area head sector No. Q and the access area size R which are stored in the access area storage unit 13 shown in FIG. 7.

Initially, the prereading area decision unit 17 decides whether or not the prereading direction value X is "1" indicating an access direction in the forward direction (step S81).

When the prereading direction value is "1", the access area size R and the prereading area-to-area interval Y are added to the access area head sector No. Q so as to calculate the prereading area sector No. (step S82).

When the prereading direction value is "0" indicating an access direction in the negative direction, the prereading area size Z and the prereading area-to-area interval Y are subtracted from the access area head sector No. Q so as to calculate the prereading area sector No. (step S83).

After the prereading area sector No. is calculated (step S82 or step S83), the prereading area decision unit 17 updates the access area head sector No. Q that is stored in the access information storage unit 13 to the prereading area sector No. which is presently calculated, and enters the prereading area size Z at the access area size R (step S84).

The prereading area decision unit 17 outputs the calculated prereading area sector No. and the prereading area size Z to the prereading startup unit 7, thereby completing the prereading area decision process (step S85).

The prereading startup unit 7 searches the cache list 12 so as to check whether the data, which is indicated by the prereading area sector No. and the prereading area size outputted from the prereading area decision unit 17, exists in the cache memory 10 or not. When the corresponding data does not exist in the cache memory 10, the prereading startup unit 7 instructs the disk transfer unit 8 to read the data that are indicated by the prereading area sector No. and the prereading area size which are outputted from the prereading area decision unit 17, thereby performing prereading of data. After the prereading, the prereading startup unit 7 updates the cache list 12 so as to complete the data prereading process.

On the other hand, when the corresponding data exists in the cache memory 10, the prereading startup unit 7 performs prereading of the next data.

Figure 9:
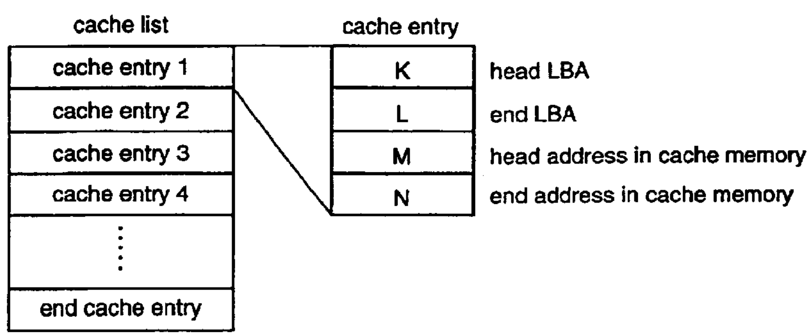
FIG. 9 is a diagram illustrating examples of a cache list and cache entries.
Figure 10:
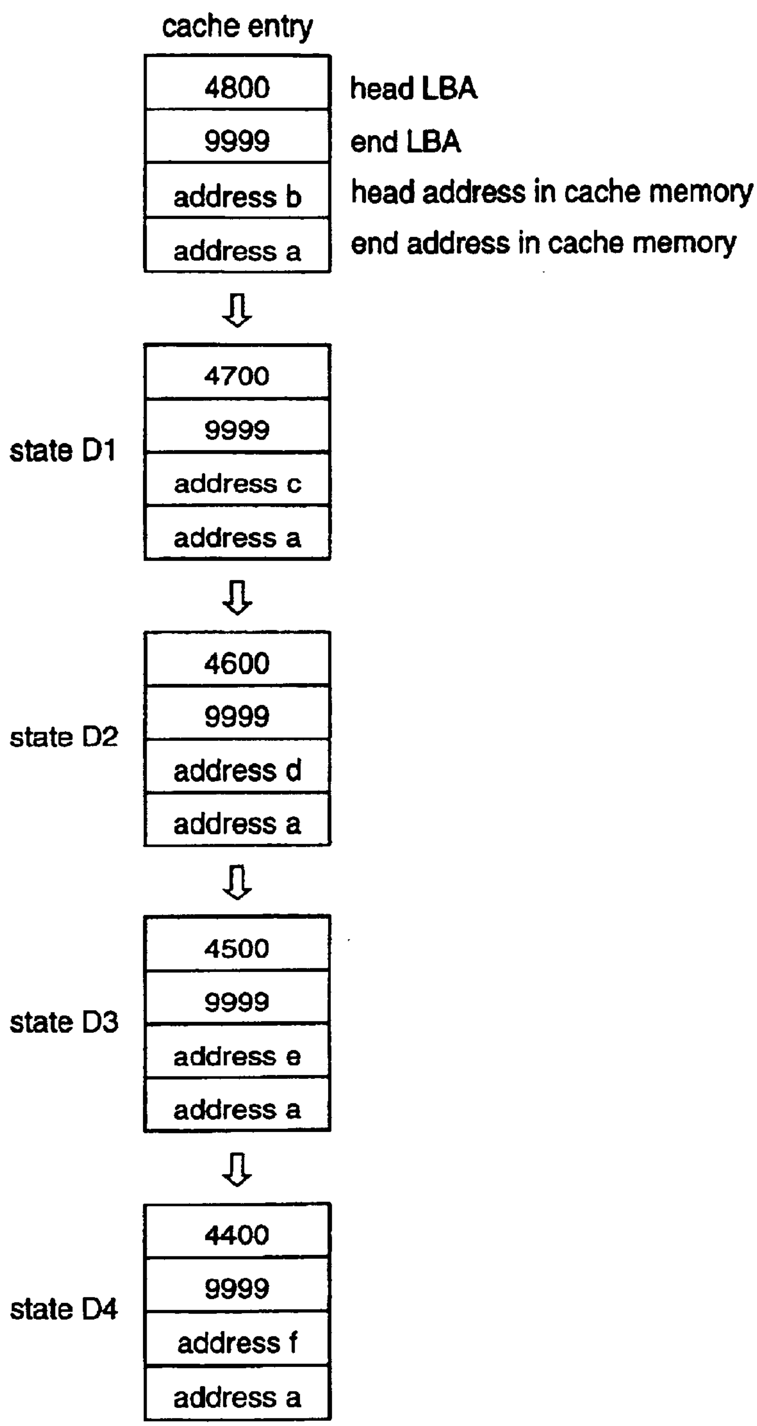
FIG. 10 is a diagram illustrating a state transition of cache entries.

Since the storage method for storing the data that are read from the disk memory medium into the cache memory 10 by the disk memory device according to the second embodiment of the present invention is identical to the data storage method which has already been described for the first embodiment employing FIGS. 8 to 10, a repeated description is not necessary.

As described above, the area which has been accessed by the just-previous read command which is stored in the read command history table 5 as a command history information storage means is compared with the area which is requested by the present read command, thereby deciding the direction along which prereading of data is to be carried out. Therefore, even in the case where data are to be read successively in the backward direction, i.e., the direction along which the address decreases, prereading of these data can be carried out, whereby continuous reading of these data in the backward direction can be performed at a high speed.

Further, the prereading rule is determined by detecting the continuity of the read commands, and the position and size of a prereading area where prereading of data is to be carried out is determined based on the prereading rule, whereby it is possible to perform prereading of data in response to continuous read commands for data areas which are separately located at equal intervals. Therefore, even when data which are located separately at equal intervals are to be continuously read, such as when data that are stored on the disk memory medium are to be played at high speed, unnecessary data are not preread, and thus the cache memory 10 can be utilized effectively.

Furthermore, when the prereading rule to be employed at present and the prereading rule which has been employed immediately before the present rule exist and, further, the prereading directions of these prereading rules are the same, the position and the size of an area on the disk memory medium where prereading of data is to be carried out are determined by employing these prereading rules in combination. Therefore, even when the data playback speed is switched from the present playback speed to the just-previous playback speed, required data have already been preread at the just-previous playback speed, and thus the required data can be transferred to the host device without rereading the data from the disk memory medium after the playback speed is switched to the just-previous playback speed.

The prereading area decision unit 17 of the disk memory device according to the second embodiment of the present invention decides whether or not prereading should be carried out by employing the previous rule in combination with the present rule. When it is decided that prereading should be carried out by employing both of the rules, prereading of data is carried out by employing both of the present prereading rule corresponding to the present read command and the previous rule which has been employed just before the present prereading rule. However, the present invention is not restricted thereto, and the prereading area decision unit 17 does not need to perform the previous rule application decision process, and therefore, prereading of data may be performed by employing only the present prereading rule corresponding to the present read command.

Further, the continuity detection unit 16 of the disk memory device according to the second embodiment of the present invention detects the data prereading direction and the area-to-area interval which is an interval of data to be preread, and prereading of data is carried out by using the result of this detection based on the prereading rule which is decided by the prereading rule decision unit 14. However, the present invention is not restricted thereto. The continuity detection unit 16 may detect only the area-to-area interval which is an interval of data to be preread, and prereading of data may be carried out by using the result of this detection based on the prereading rule which is decided by the prereading rule decision unit 14. Also, in this case, prereading of data can be efficiently carried out in response to continuous read commands which require data that are located separately at equal intervals.

Furthermore, as shown in FIG. 11, the processes of the cache hit judgement unit 3, the continuity detection unit 16, the prereading rule decision unit 14, the prereading area decision unit 17, and the prereading startup unit 7 are carried out by a CPU 103, and the read command history table 5, the cache list 12, the access area information storage unit 13, and the prereading rule table 15 are arranged on a RAM 102 which is readable and writable from the CPU 103.

Third Embodiment

Hereinafter, a disk memory device according to a third embodiment of the present invention will be described with reference to FIGS. 20 to 23.

Figure 20:
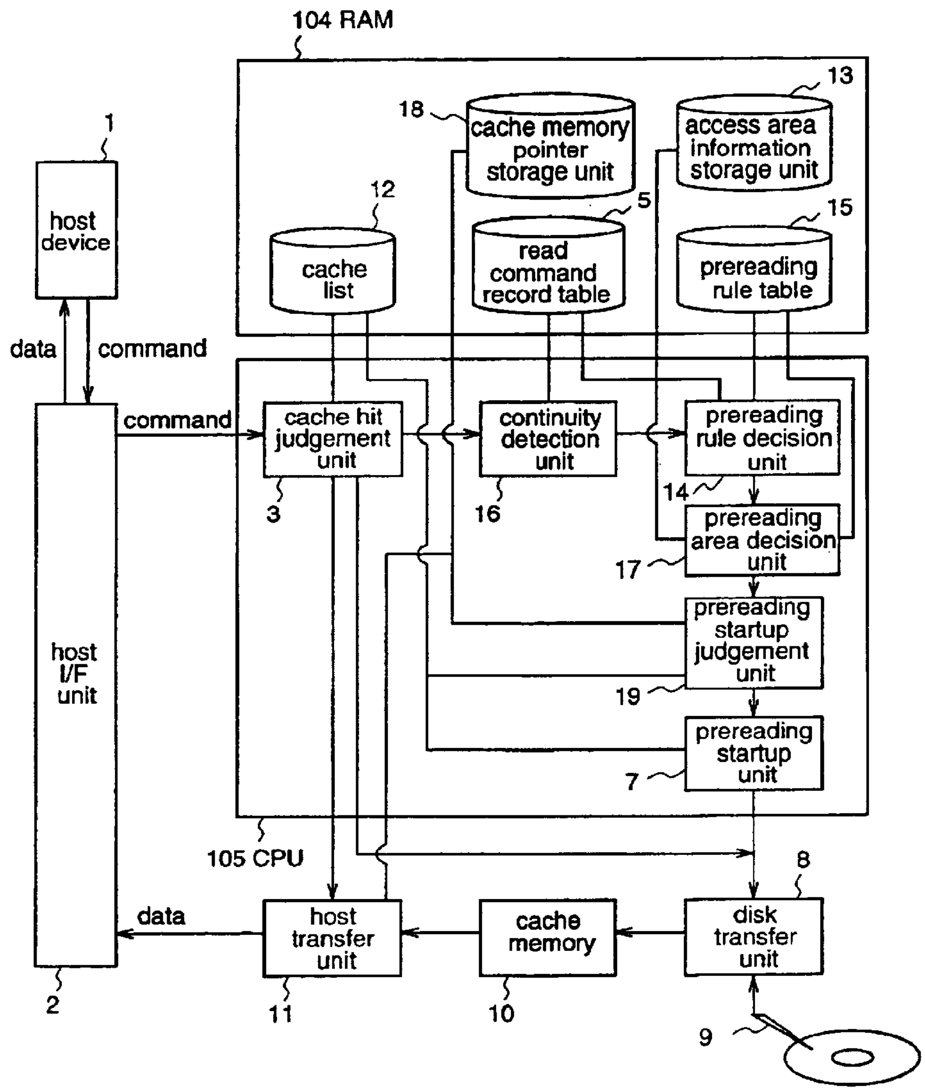
FIG. 20 is a block diagram illustrating an example of a construction of a disk memory device according to a third embodiment of the present invention.

FIG. 20 shows an example of a block diagram illustrating the construction of the disk memory device according to the third embodiment of the present invention. In FIG. 20, a host device 1 outputs a read command which instructs the disk memory device to read data that are recorded on a disk memory medium.

Further, the disk memory device according to the third embodiment of the present invention comprises a host I/F unit 2, a cache hit judgement unit 3, a continuity detection unit 16, a read command history (record) table 5 as a command history information storage means, a prereading rule decision unit 14, a prereading rule table (holding unit) 15 as a prereading rule storage means, a prereading area decision unit 17, a prereading startup unit 7, a disk transfer unit B, a cache memory 10, a host transfer unit 11, a cache list 12, an access area information storage unit 13, a cache memory pointer storage unit 18, and a prereading startup judgement unit 19.

The disk memory device according to the third embodiment of the present invention is different from the above-mentioned second embodiment in that a protection area is provided so as to leave at least several blocks of data, which have already transferred to the upper (host) device 1, on the cache memory. Therefore, the constituent elements of the third embodiment performing the same operations as those described for the second embodiment are given the same reference numerals, and descriptions thereof will be omitted.

The cache memory pointer storage unit 18 holds an under-sending address indicating the position on the cache memory where the data which is currently being sent to the host device is located, and a next-prereading data storage start address indicating the position on the cache memory where the next preread data is to be stored.

The prereading startup judgement unit 19 performs a prereading startup judgement process for judging whether or not the prereading of data should be carried out so as to leave at least several blocks of data, which have already been transferred to the host device, on the cache memory.

Since the fundamental processing that is performed by the disk memory device according to the third embodiment of the present invention is identical to the fundamental processing by the disk memory device according to the first embodiment which has already been described with respect to FIG. 2, a repeated description is not necessary.

Next, the data prereading process that is performed by the disk memory device according to the third embodiment of the present invention will be described with reference to FIG. 21.

While executing the fundamental processing which has been described with reference to FIG. 2, the continuity detection unit 16, which has received a read command from the host device 1 through the host I/F unit 2, performs a continuity detection process for calculating an access direction and an area-to-area interval based on the position of a data area which has been requested by the last read command which is recorded on the read command history table 5 as a command history information storage means, and the position of a data area which is requested by the present real command (step S31).

Next, the prereading rule decision unit 14 performs a prereading rule decision process for deciding a prereading rule that is to be used for prereading of data by using the access direction and the area-to-area interval which are calculated by the continuity detection unit 16, and the size of the data area which is presently requested (step S32). The decided prereading rule is stored in the prereading rule table 15 as a prereading rule storage means.

The prereading area decision unit 17 performs a prereading area decision process for deciding a prereading rule that is to be applied to the prereading of data by performing a previous rule application judgement process for judging whether prereading of data should be carried out by employing a previous prereading rule which has been employed immediately before the prereading rule to be employed according to the present read command, and deciding the position and size of an area on the disk memory medium where prereading is to be carried out based on the decided prereading rule (step S33).

Next, the prereading startup judgement unit 19 performs a prereading startup judgement for judging whether prereading should be carried out or not by employing the under-sending address and the next-prereading data storage start address which are stored in the cache memory pointer storage unit 18 (step S91).

When it is judged that prereading should not be carried out, the prereading startup unit 7 searches the cache list 12 so as to check whether the data in the prereading area which is decided by the prereading area decision unit 17 exists on the cache memory 10 or not (step S34).

When the data in the prereading area which is decided by the prereading area decision unit 17 does not exist on the cache memory 10, the prereading startup unit 7 instructs the disk transfer unit 8 to read the data in the prereading area which is decided by the prereading area decision unit 17, thereby performing prereading of the data (step S35). Further, after the prereading of the data, the prereading startup unit 7 performs updation of the cache list 12 so as to indicate the details of the data that are stored on the cache memory 10 (step S36).

On the other hand, when the data in the prereading area which is decided by the prereading area decision unit 17 exists on the cache memory 10, the prereading of the corresponding data is ended.

The prereading area decision process in step S33 and the following processes are repeatedly carried out until the disk memory device receives a new command from the host device 1 (step S37).

Figure 21:
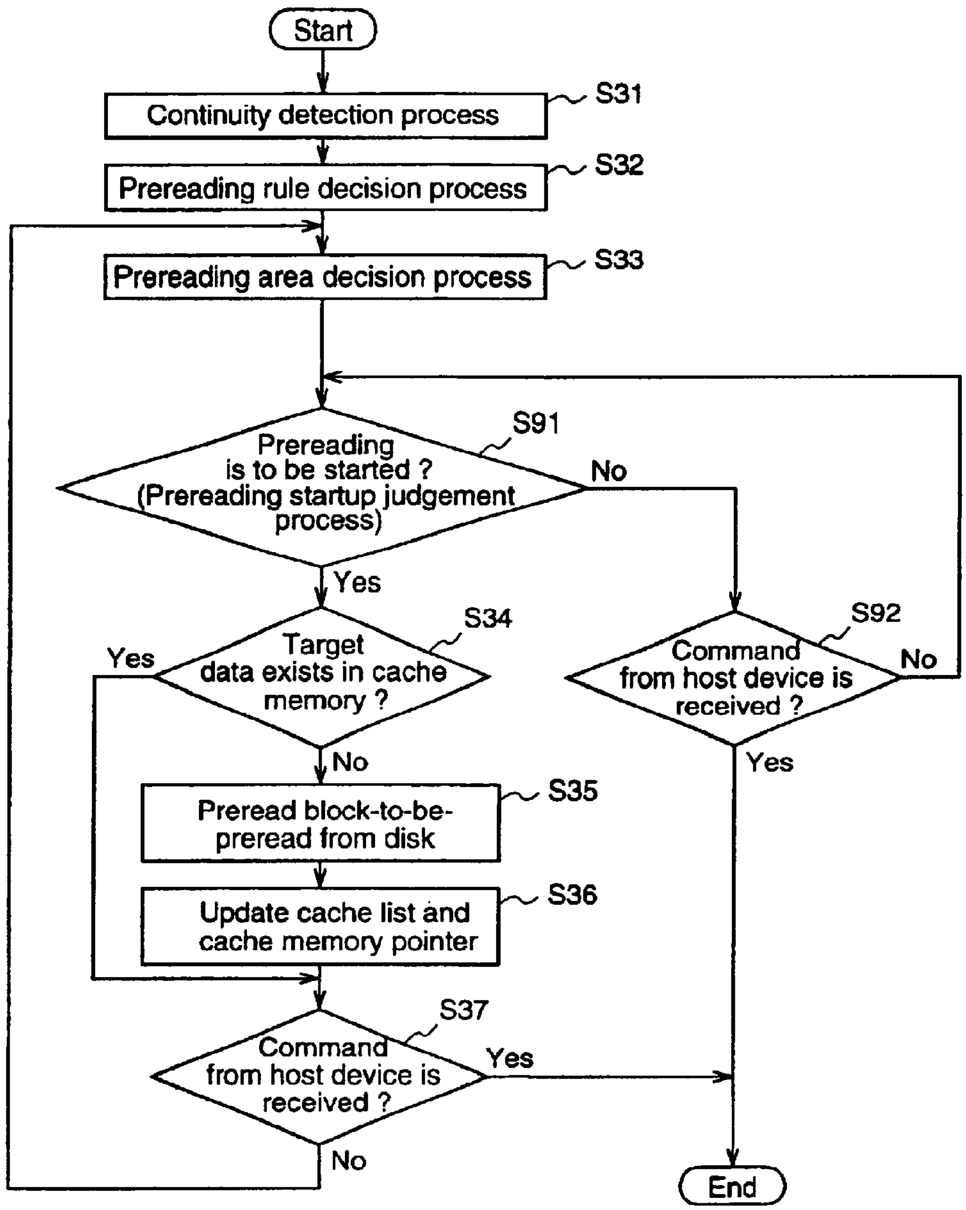
FIG. 21 is a flowchart illustrating an example of a prereading process that is performed by the disk memory device according to the third embodiment of the present invention.

The continuity detection process that is performed by the continuity detection unit 16 in step S31 shown in FIG. 21, the prereading rule decision process that is performed by the prereading rule decision unit 14 in step S32, and the prereading rule decision process that is performed by the prereading area decision unit 17 in step S33 are identical to those described above according to the above-described second embodiment and, therefore, descriptions thereof will be omitted.

Next, the prereading startup judgement process that is performed by the prereading startup judgement unit 19 in step S91 shown in FIG. 21 will be described with reference to FIGS. 22 to 24.

Figure 22:
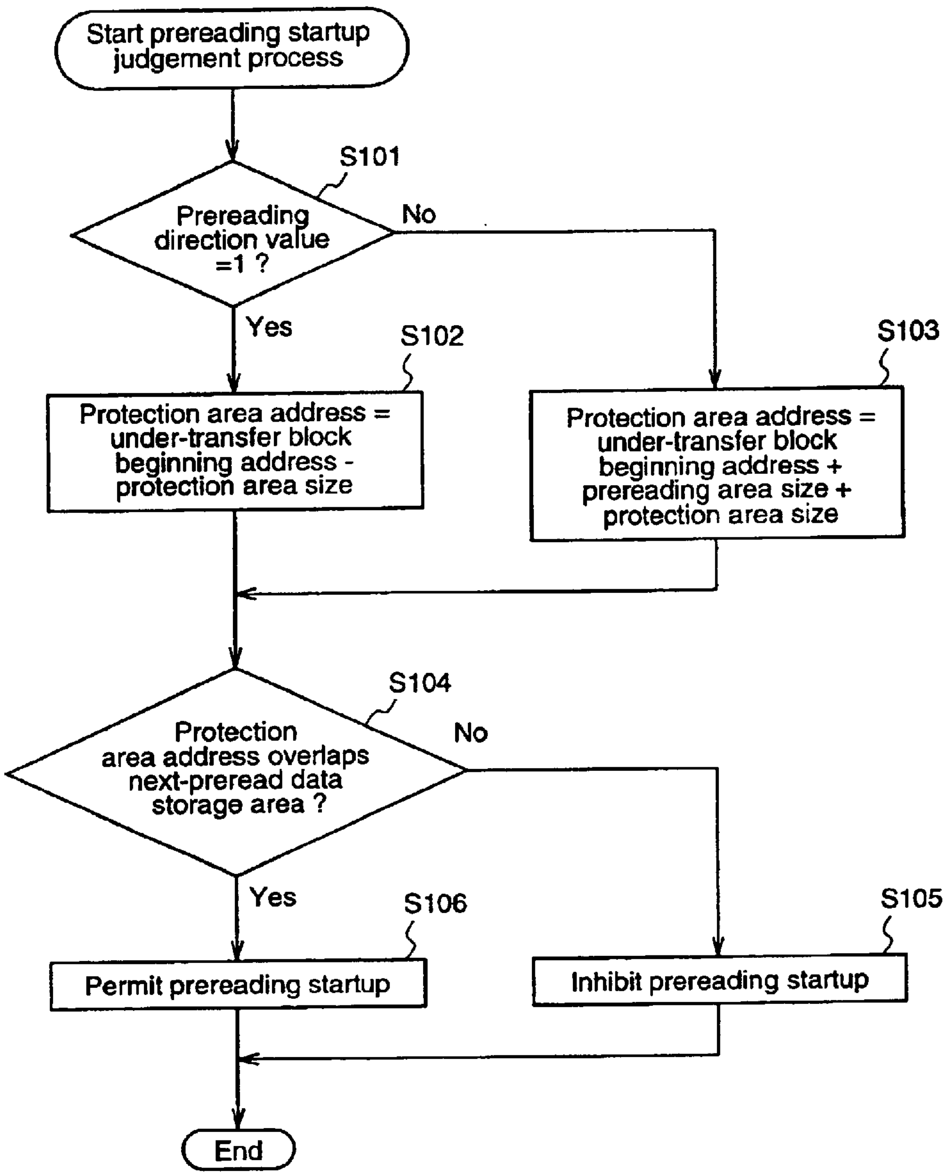
FIG. 22 is a flowchart illustrating an example of a prereading startup judgement process that is performed by the disk memory device according to the third embodiment of the present invention.
Figure 23:
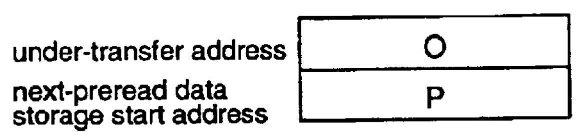
FIG. 23 is a diagram illustrating an example of a data structure in a cache memory pointer storage unit.
Figure 24:
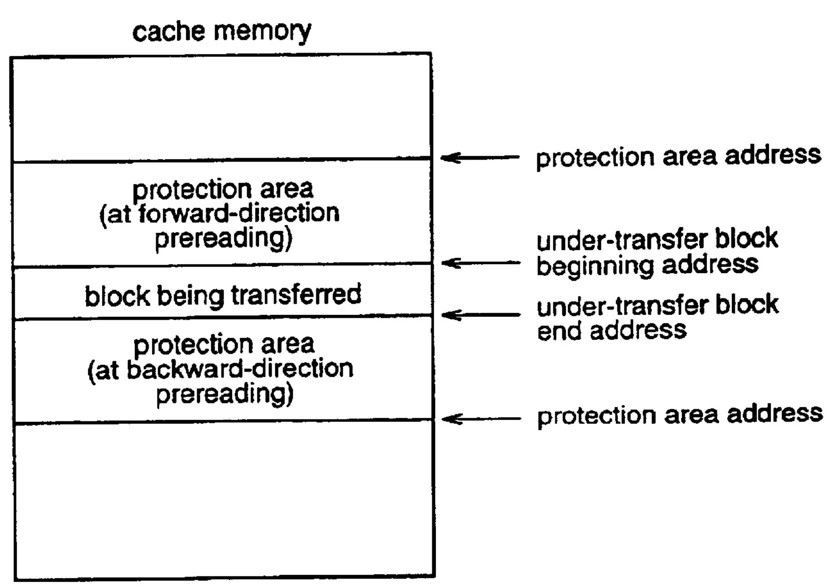
FIG. 24 is a diagram illustrating a data structure in a cache memory.

FIG. 22 is a flowchart for explaining the prereading startup judgement process that is performed by the prereading startup judgement unit 19 of the disk memory device according to the third embodiment of the present invention, FIG. 23 is a diagram illustrating an example of a cache list which is stored in the cache memory pointer storage unit 18, and FIG. 24 is a diagram for explaining a protection area which is a data that are area where the data stored on the cache memory 10 are protected.

With reference to FIG. 23, the cache memory pointer storage unit 18 holds an under-data-transfer address 0 indicating a cache memory address as a beginning address of a data block on the cache memory 10, which block is currently being transferred to the host device 1, and a preread data storage address P which is a cache memory address on the cache memory where the next-preread data is to be stored.

Initially, the prereading startup judgement unit 19 performs a judgement as to whether the prereading direction value X of the prereading rule entry on the prereading rule table 14, which is specified in the prereading area decision process (step S33), is "1" or not, i.e., whether prereading is to be performed in the forward direction or not (step S101).

When the prereading direction value X is "1", i.e., when prereading is to be performed in the forward direction, a predetermined protection area size is subtracted from the under-transfer address 0 which is the beginning address of the data block currently being transferred to the host device 1, which address is stored in the cache memory pointer storage unit 18, so as to calculate a protection area address which is a boundary address for protecting a predetermined amount of data in the backward direction with respect to the data currently being transferred (step S102).

On the other hand, when the prereading direction value X is not "1" but "0", i.e., when prereading is to be performed in the backward direction, the prereading area size Z shown in FIG. 16 and the predetermined protection area size are added to the under-transfer address 0 so as to calculate a protection area address which is a boundary address for protecting a predetermined amount of data in the forward direction with respect to the data currently being transferred (step S103).

Next, the prereading startup judgement unit 19 judges whether or not the protection area address overlaps the area where the next preread data is to be stored, which area is determined on the basis of the next preread data storage start address P that is stored in the cache memory pointer storage unit 18, and the prereading area size Z shown in FIG. 16 (step S104).

When the protection area address overlaps the area where the next preread data is to be stored, prereading of data is inhibited, and the prereading startup judgement process is ended (step S105).

On the other hand, when the protection area address does 6 not overlap the next preread data storage area, prereading of data is permitted, and the prereading startup judgement process is ended (step S106).

When prereading of data is permitted in the prereading startup judgement process, the prereading startup unit 7 searches the cache list 12 so as to check whether the data which is indicated by the prereading area sector No. and the prereading area size which are outputted from the prereading area decision unit 17, exists on the cache memory 10 or not. When the corresponding data does not exist on the cache memory 10, the prereading startup unit 7 instructs the disk transfer unit 8 to read the data that are indicated by the prereading area sector No. and the prereading area size which are outputted from the prereading area decision unit 17, thereby performing prereading of data. Further, after the prereading of data, the prereading startup unit 7 updates the cache list 12 so as to complete the data prereading process.

On the other hand, when the corresponding data exists on the cache memory 10, the prereading startup unit 7 performs prereading of the next data.

Since the method of storing the data that are read from the disk memory medium by the disk memory device according to the third embodiment of the invention is identical to the data storage method which has been described for the first embodiment employing FIGS. 8 to 10, a repeated description is not necessary.

As described above, prereading of data is carried out with a protection area being provided so as to leave, on the cache memory 10, at least several blocks of data which have already transferred to the host device 1, by employing the under-transfer address indicating the position on the cache memory 10 where the data being currently transferred to the host device 1 is located, and the next preread data storage start address indicating the position on the cache memory 10 where the next preread data is to be stored. Therefore, even when playback of data is carried out while frequently switching the playback direction between the forward direction and the backward direction, the data which have already been transferred to the host device 1 just before the switching of the playback direction can be stored in the cache memory 10 at the point of time when the playback direction is switched, whereby the already-transferred data just before the switching of the playback direction, which data is required for playback just after the playback direction switching, can be transferred to the host device 1 without rereading the corresponding data from the disk memory medium.

While the disk memory device according to the third embodiment of the present invention is provided with the cache memory pointer storage unit 18 and the prereading startup judgement unit 19 in addition to the construction of the disk memory device according to the second embodiment, the present invention is not restricted thereto, and the same effects as those described above-can be achieved by a disk memory device which is provided with the cache memory pointer storage unit 18 and the prereading startup decision unit 19 in addition to the construction of the disk memory device according to the first embodiment.

Furthermore, as shown in FIG. 20, the processes of the cache hit judgement unit 3, the continuity detection unit 16, the prereading rule decision unit 14, the prereading area decision unit 17, the prereading startup judgement unit 19, and the prereading startup unit 7 are carried out by a CPU 105, and the read command history table 5, the cache list 12, the access area information storage unit 13, the prereading rule table 15, and the cache memory pointer storage unit 18 are arranged on a RAM 104 which is readable and writable from the CPU 103.

Fourth Embodiment

The disk memory devices described above for the first to third embodiments are controlled by control programs which are possessed by ROMs contained in the CPUs 101, 103, and 105 shown in FIGS. 1, 11, and 20, respectively. The same effects as those described for the first to third embodiments can be achieved-when providing these control programs through communication means such as the Internet or other networks as well as providing these control programs as being contained in various kinds of media.

Furthermore, as recording media in which the programs are to be recorded, there are, for example, floppy disk, hard disk, optical disk, magnetic disk, magneto-optical disk, CD-ROM, magnetic tape, punch card, nonvolatile memory card, etc.

APPLICABILITY IN INDUSTRY

The disk memory device according to the present invention enables the prereading of data that are recorded on a disk memory medium, such as a magnetic disk or an optical disk, in the backward direction, and efficient prereading of data which are located separately at equal intervals, thereby improving data transfer by the data prereading of the disk memory device.

What is claimed is:

1. A data prereading device comprising:

a command history information storage unit operable to hold historic information of read commands which are received from a host device as information for reading data recorded on a disk memory medium;

a continuity detection unit operable to detect a direction along which prereading of data is to be performed based on the read commands held in said command history information storage unit;

a prereading area decision unit operable to decide the position and size of data on the disk memory medium to be preread based on the read commands held in said command history information storage unit and the data prereading direction detected by said continuity detection unit;

a cache memory operable to hold preread data;

a prereading startup unit operable to read, from the disk memory medium, the data to be preread which said prereading area decision unit decided is to be preread, and to store the preread data in said cache memory;

a cache memory pointer holding unit operable to hold an under-transfer address indicating the position, on said cache memory, of data which is currently being transferred to the host device, and a next preread data storage start address indicating the position on the cache memory where next preread data is to be stored; and a prereading startup judgement unit operable to judge whether or not prereading of data is to be performed so as to leave at least several blocks of data which have already been transferred to the host device on the cache memory by employing the under-transfer address and the next preread data storage start address held by said cache memory pointer holding unit.

2. A data prereading device comprising:

a command history information storage unit operable to hold historic information of read commands which are received from a host device as information for reading data recorded on a disk memory medium;

a continuity detection unit operable to detect an area-to-area distance which is an interval of data to be preread based on the read commands held in said command history information storage unit;

a prereading rule holding unit operable to hold a plurality of prereading rules for performing prereading of data;

a prereading rule decision unit operable to decide a prereading rule to be used for prereading of data based on the read commands held in said command history information storage unit, the area-to-area distance detected by said continuity detection unit, and the plurality of prereading rules held by said prereading rule holding unit;

a prereading area decision unit operable to decide the position and size of data on the disk memory medium to be preread by employing two prereading rules in combination when said prereading rule decision unit has decided a prereading rule and a previous prereading rule has been employed immediately before the prereading rule decided by said prereading rule decision unit, and the prereading directions of the prereading rule decided by said prereading rule decision unit and the previous prereading rule are the same;

a cache memory operable to hold preread data; and a prereading startup unit operable to read, from the disk memory medium, the data to be preread which said prereading rule area decision unit decided is to be preread, and to store the preread data into said cache memory.

3. A data prereading device according to claim 2, further comprising:

a cache memory pointer holding unit operable to hold an under-transfer address indicating the position, on said cache memory, of data which is currently being transferred to the host device, and a next preread data storage start address indicating the position on the cache memory where next preread data is to be stored; and a prereading startup judgement unit operable to judge whether or not prereading of data is to be performed so as to leave at least several blocks of data which have already been transferred to the host device on the cache memory by employing the under-transfer address and the next preread data storage start address held by said cache memory pointer holding unit.

4. A data prereading device according to claim 2, wherein said prereading startup unit is operable to control preread data to be stored on the cache memory in the backward direction successively in front of preread data in the forward direction.

5. A data prereading device comprising:

a command history information storage unit operable to hold historic information of read commands which are received from a host device as information for reading data recorded on a disk memory medium;

a continuity detection unit operable to detect a direction along which prereading of data is to be performed and an area-to-area distance which is an interval of data to be preread based on the read commands held in said command history information storage unit;

a prereading rule holding unit operable to hold a plurality of prereading rules for performing prereading of data;

a prereading rule decision unit operable to decide a prereading rule to be used for prereading of data based on the read commands held in said command history information storage unit, the data prereading direction and the area-to-area distance detected by said continuity detection unit, and the plurality of prereading rules held by said prereading rule holding unit;

a prereading area decision unit operable to decide the position and size of data on the disk memory medium to be preread by employing two prereading rules in combination when said prereading rule decision unit has decided a prereading rule and a previous prereading rule has been employed immediately before the prereading rule decided by said prereading rule decision unit, and the prereading directions of the prereading rule decided by said prereading rule decision unit and the previous prereading rule are the same;

a cache memory operable to hold preread data; and a prereading startup unit operable to read, from the disk memory medium, the data to be preread which said prereading rule area decision unit decided is to be preread, and to store the preread data into said cache memory.

6. A data prereading device according to claim 5, further comprising:

a cache memory pointer holding unit operable to hold an under-transfer address indicating the position, on said cache memory, of data which is currently being transferred to the host device, and a next preread data storage start address indicating the position on the cache memory where next preread data is to be stored; and a prereading startup judgement unit operable to judge whether or not prereading of data is to be performed so as to leave at least several blocks of data which have already been transferred to the host device on the cache memory by employing the under-transfer address and the next preread data storage start address held by said cache memory pointer holding unit.

7. A data prereading device according to claim 5, wherein said prereading startup unit is operable to control preread data to be stored on the cache memory in the backward direction successively in front of preread data in the forward direction.

8. A data prereading method comprising:

detecting a direction along which prereading of data is to be performed based on read commands which are received from a host device as information for reading data recorded on a disk memory medium;

deciding the position and size of data on the disk memory medium to be preread based on the received read commands and the data prereading direction detected in said detecting of the direction along with prereading of data is to be performed; and reading, from the disk memory medium, the data to be preread decided in said deciding of the position and size of the data to be preread, and storing the preread data in a cache memory which is a storage area for the preread data; and judging whether or not prereading of data is to be performed so as to leave at least several blocks of data on the cache memory which have already been transferred to the host device by employing an under-transfer address indicating the position, on the cache memory, of data which is currently being transferred to the host device, and a next preread data storage start address indicating the position on the cache memory where next preread data is to be stored.

9. A data prereading method comprising:

detecting an area-to-area distance which is an interval of data to be preread based on read commands which are received from a host device as information for reading data recorded on a disk memory medium;

deciding a prereading rule to be used for prereading of data based on the received read commands, the area-to-area distance detected in said detecting of the area-to-area distance, and prereading rules held by a prereading rule holding unit which holds a plurality of prereading rules for performing prereading of data;

deciding the position and size of data on the disk memory medium to be preread by employing two prereading rules in combination when said deciding of the prereading rule decided a prereading rule and a previous prereading rule has been employed immediately before the prereading rule decided by said deciding of the prereading rule, and the prereading directions of the prereading rule decided by said prereading of the decision rule and the previous prereading rule are the same; and reading, from the disk memory medium, the data to be preread corresponding to the position and size decided in said deciding of the position and size of the data, and storing the preread data into a cache memory which holds the preread data.

10. A data prereading method according to claim 9, further comprising:

judging whether or not prereading of data is to be performed so as to leave at least several blocks of data on the cache memory which have already been transferred to the host device by employing an under-transfer address indicating the position, on the cache memory, of data which is currently being transferred to the host device, and a next preread data storage start address indicating the position on the cache memory where next preread data is to be stored.

11. A data prereading method according to claim 9, wherein said judging of whether or not prereading of data is to be performed stores preread data on the cache memory in the backward direction successively in front of preread data in the forward direction.

12. A data prereading method comprising:

detecting a direction along which prereading of data is to be performed and an area-to-area distance which is an interval of data to be preread based on read commands which are received from a host device as information for reading data recorded on a disk memory medium;

deciding a prereading rule to be used for prereading of data based on the received read commands, the data prereading direction and the area-to-area distance detected in said detecting of the direction along which prereading of data is to be performed and the area-to-area distance, and prereading rules held by a prereading rule holding unit which holds a plurality of prereading rules for performing prereading of data;

deciding the position and size of data on the disk memory medium to be preread by employing two prereading rules in combination when said deciding of the prereading rule decided a prereading rule and a previous prereading rule has been employed immediately before the prereading rule decided by said deciding of the prereading rule, and the prereading directions of the prereading rule decided by said prereading of the decision rule and the previous prereading rule are the same; and reading from the disk memory medium, the data to be preread corresponding to the position and size decided in said deciding of the position and size of the data, and storing the preread data into a cache memory which holds the preread data.

13. A data prereading method according to claim 12, further comprising:

judging whether or not prereading of data is to be performed so as to leave at least several blocks of data on the cache memory which have already been transferred to the host device by employing an under-transfer address indicating the position, on the cache memory, of data which is currently being transferred to the host device, and a next preread data storage start address indicating the position on the cache memory where next preread data is to be stored.

14. A data prereading method according to claim 12, wherein said judging of whether or not prereading of data is to be performed stores preread data on the cache memory in the backward direction successively in front of preread data in the forward direction.

15. A computer-readable recording medium on which a program for making a computer execute a data prereading method is recorded, said data prereading method comprising:

detecting a direction along which prereading of data is to be performed based on read commands which are received from a host device as information for reading data recorded on a disk memory medium;

deciding the position and size of data on the disk memory medium to be preread based on the received read commands and the data prereading direction detected in said detecting of the direction along with prereading of data is to be performed; and reading, from the disk memory medium, the data to be preread decided in said deciding of the position and size of the data to be preread, and storing the preread data in a cache memory which is a storage area for the preread data; and judging whether or not prereading of data is to be performed so as to leave at least several blocks of data on the cache memory which have already been transferred to the host device by employing an upper-transfer address indicating the position, on the cache memory, of data which is currently being transferred to the host device, and a next preread data storage start address indicating the position on the cache memory where next preread data is to be stored.

16. A computer-readable recording medium on which a program for making a computer execute a data prereading method is recorded, said data prereading method comprising:

detecting an area-to-area distance which is an interval of data to be preread based on read commands which are received from a host device as information for reading data recorded on a disk memory medium;

deciding a prereading rule to be used for prereading of data based on the received read commands, the area-to-area distance detected in said detecting of the area-to-area distance, and prereading rules held by a prereading rule holding unit which holds a plurality of prereading rules for performing prereading of data;

deciding the position and size of data on the disk memory medium to be preread by employing two prereading rules in combination when said deciding of the prereading rule decided a prereading rule and a previous prereading rule has been employed immediately before the prereading rule decided by said deciding of the prereading rule, and the prereading directions of the prereading rule decided by said prereading of the decision rule and the previous prereading rule are the same; and reading, from the disk memory medium, the data to be preread corresponding to the position and size decided in said deciding of the position and size of the data, and storing the preread data into a cache memory which holds the preread data.

17. A recording medium according to claim 16, on which a program for making a computer execute a data prereading method is recorded, wherein said data prereading method further comprises:

judging whether or not prereading of data is to be performed so as to leave at least several blocks of data on the cache memory which have already been transferred to the host device by employing an under-transfer address indicating the position, on the cache memory, of data which is currently being transferred to the host device, and a next preread data storage start address indicating the position on the cache memory where next preread data is to be stored.

18. A recording medium according to claim 16, on which a program for making a computer execute a data prereading method is recorded, wherein said judging of whether or not prereading of data is to be performed stores preread data on the cache memory in the backward direction successively in front of preread data in the forward direction.

19. A computer-readable recording medium on which a program for making a computer execute a data prereading method is recorded, said data prereading method comprising:

detecting a direction along which prereading of data is to be performed and an area-to-area distance which is an interval of data to be preread based on read commands which are received from a host device as information for reading data recorded on a disk memory medium;

deciding a prereading rule to be used for prereading of data based on the received read commands, the data prereading direction and the area-to-area distance detected in said detecting of the direction along which prereading of data is to be performed and the area-to-area distance, and prereading rules held by a prereading rule holding unit which holds a plurality of prereading rules for performing prereading of data;

deciding the position and size of data on the disk memory medium to be preread by employing two prereading rules in combination when said deciding of the prereading rule decided a prereading rule and a previous prereading rule has been employed immediately before the prereading rule decided by said deciding of the prereading rule, and the prereading directions of the prereading rule decided by said prereading of the decision rule and the previous prereading rule are the same; and reading, from the disk memory medium, the data to be preread corresponding to the position and size decided in said deciding of the position and size of the data, and storing the preread data into a cache memory which holds the preread data.

20. A recording medium according to claim 19, on which a program for making a computer execute a data prereading method is recorded, wherein said data prereading method further comprises:

judging whether or not prereading of data is to be performed so as to leave at least several blocks of data on the cache memory which have already been transferred to the host device by employing an under-transfer address indicating the position, on the cache memory, of data which is currently being transferred to the host device, and a next preread data storage start address indicating the position on the cache memory where next preread data is to be stored.

21. A recording medium according to claim 19, on which a program for making a computer execute a data prereading method is recorded, wherein said judging of whether or not prereading of data is to be performed stores preread data on the cache memory in the backward direction successively in front of preread data in the forward direction.

22. A disk memory device comprising:

a command history information storage unit operable to hold historic information of read commands which are received from a host device as information for reading data recorded on a disk memory medium;

a continuity detection unit operable to detect a direction along which prereading of data is to be performed based on the read commands held in said command history information storage unit;

a prereading area decision unit operable to decide the position and size of data on the disk memory medium to be preread based on the read commands held in said command history information storage unit and the data prereading direction detected by said continuity detection unit;

a cache memory operable to hold preread data; and a prereading startup unit operable to read, from the disk memory medium, the data to be preread which said prereading area decision unit decided is to be preread, and to store the preread data in said cache memory;

wherein said prereading startup unit is operable to control preread data to be stored on the cache memory in the backward direction successively in front of preread data in the forward direction.

23. A disk memory device comprising:

a command history information storage unit operable to hold historic information of read commands which are received from a host device as information for reading data recorded on a disk memory medium;

a continuity detection unit operable to detect a direction along which prereading of data is to be performed and an area-to-area distance which is an interval of data to be preread based on the read commands held in said command history information storage unit;

a prereading rule holding unit operable to hold prereading rules for performing prereading of data;

a prereading rule decision unit operable to decide a prereading rule to be used for prereading of data based on the read commands held in said command history information storage unit, the data prereading direction and the area-to-area distance detected by said continuity detection unit, and the prereading rules held by said prereading rule holding unit;

a prereading area decision unit operable to decide the position and size of data on the disk memory medium to be preread based on the prereading rule decided by said prereading rule decision unit;

a cache memory operable to hold preread data; and prereading startup unit operable to read, from the disk memory medium, the data to be preread which said prereading area decision unit decided is to be preread, and to store the data into said cache memory;

wherein said prereading startup unit is operable to control preread data to be stored on the cache memory in the backward direction successively in front of preread data in the forward direction.

24. A data prereading method comprising:

detecting a direction along which prereading of data is to be performed based on read commands which are received from a host device as information for reading data recorded on a disk memory medium;

deciding the position and size of data on the disk memory medium to be preread based on the received read commands and the data prereading direction detected in said detecting of the direction along with prereading of data is to be performed; and reading, from the disk memory medium, the data to be preread decided in said deciding of the position and size of the data to be preread, and storing the preread data in a cache memory which is a storage area for the preread data;

wherein said reading of the data stores preread data on the cache memory in the backward direction successively in front of preread data in the forward direction.

25. A data prereading method comprising:

detecting a direction along which prereading of data is to be performed and an area-to-area distance which is an interval of data to be preread based on read commands which are received from a host device as information for reading data recorded on a disk memory medium;

deciding a prereading rule to be used for prereading of data based on the received read commands, the data prereading direction and the area-to-area distance detected in said detecting of the direction along which prereading of data is to be performed and the area-to-area distance, and prereading rules held by a prereading rule holding unit which holds prereading rules for performing prereading of data;

deciding the position and size of data on the disk memory medium to be preread based on the prereading rule to be used for prereading of data decided in said deciding of the prereading rule; and reading the data on the disk memory medium to be preread corresponding to the position and size decided in said deciding of the position and size of the data, and storing the preread data into a cache memory which is a storage area for the preread data;

wherein said reading of the data stores preread data on the cache memory in the backward direction successively in front of preread data in the forward direction.

26. A computer-readable recording medium on which a program for making a computer execute a data prereading method is recorded, said data prereading method comprising:

detecting a direction along which prereading of data is to be performed based on read commands which are received from a host device as information for reading data recorded on a disk memory medium;

deciding the position and size of data on the disk memory medium to be preread based on the received read commands and the data prereading direction detected in said detecting of the direction along with prereading of data is to be performed; and reading, from the disk memory medium, the data to be preread decided in said deciding of the position and size of the data to be preread, and storing the preread data in a cache memory which is a storage area for the preread data;

wherein said reading of the data stores preread data on the cache memory in the backward direction successively in front of preread data in the forward direction.

27. A computer-readable recording medium on which a program for making a computer execute a data prereading method is recorded, said data prereading method comprising:

detecting a direction along which prereading of data is to be performed and an area-to-area distance which is an interval of data to be preread based on read commands which are received from a host device as information for reading data recorded on a disk memory medium;

deciding a prereading rule to be used for prereading of data based on the received read commands, the data prereading direction and the area-to-area distance detected in said detecting of the direction along which prereading of data is to be performed and the area-to-area distance, and prereading rules held by a prereading rule holding unit which holds prereading rules for performing prereading of data;

deciding the position and size of data on the disk memory medium to be preread based on the prereading rule to be used for prereading of data decided in said deciding of the prereading rule; and reading the data on the disk memory medium to be preread corresponding to the position and size decided in said deciding of the position and size of the data, and storing the preread data into a cache memory which is a storage area for the preread data;

wherein said reading of the data stores preread data on the cache memory in the backward direction successively in front of preread data in the forward direction.

* * * * *